(12) United States Patent
Obata et al.

(10) Patent No.: US 11,926,683 B2
(45) Date of Patent: Mar. 12, 2024

(54) CURABLE MATERIAL AND METHOD FOR MOLDING SAID THERMALLY CURABLE MATERIAL

(71) Applicant: IDEMITSU KOSAN CO., LTD., Chiyoda-ku (JP)

(72) Inventors: Yutaka Obata, Chiba (JP); Haruhiko Mori, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 807 days.

(21) Appl. No.: 16/626,812

(22) PCT Filed: Jun. 29, 2018

(86) PCT No.: PCT/JP2018/024960
§ 371 (c)(1),
(2) Date: Dec. 26, 2019

(87) PCT Pub. No.: WO2019/004470
PCT Pub. Date: Jan. 3, 2019

(65) Prior Publication Data
US 2020/0157257 A1    May 21, 2020

(30) Foreign Application Priority Data
Jun. 30, 2017   (JP) ................. 2017-129792

(51) Int. Cl.
| | |
|---|---|
| C08F 20/18 | (2006.01) |
| B29C 45/00 | (2006.01) |
| B29C 45/02 | (2006.01) |
| B29K 33/04 | (2006.01) |
| B29K 105/00 | (2006.01) |
| B29K 507/04 | (2006.01) |
| B29K 509/08 | (2006.01) |
| C08K 3/04 | (2006.01) |
| C08K 3/22 | (2006.01) |
| C08K 3/36 | (2006.01) |
| C08K 7/18 | (2006.01) |
| C08K 9/06 | (2006.01) |

(52) U.S. Cl.
CPC .......... *C08F 20/18* (2013.01); *B29C 45/0001* (2013.01); *B29C 45/02* (2013.01); *C08K 3/04* (2013.01); *C08K 3/22* (2013.01); *C08K 3/36* (2013.01); *C08K 7/18* (2013.01); *C08K 9/06* (2013.01); *B29K 2033/04* (2013.01); *B29K 2105/0002* (2013.01); *B29K 2105/0032* (2013.01); *B29K 2507/04* (2013.01); *B29K 2509/08* (2013.01); *C08K 2003/2241* (2013.01); *C08K 2201/003* (2013.01); *C08K 2201/011* (2013.01); *C08K 2201/014* (2013.01)

(58) Field of Classification Search
CPC ... C08K 3/22; C08K 3/36; C08K 7/18; C08K 9/06; C08K 2003/2241; C08K 2201/003; C08K 2201/011; C08K 2201/014; C08K 2003/2237; C08K 3/013; C08K 2201/005; C08K 3/04; B29K 2033/04; B29K 2105/0002; B29K 2105/0032; B29K 2507/04; B29K 2509/08; B29K 2003/2241; B29C 45/34; B29C 45/00; B29C 45/0001; B29C 45/02; C08F 222/102; C08F 2/44; C08F 20/18
See application file for complete search history.

(56) References Cited

U.S. PATENT DOCUMENTS

| | | | |
|---|---|---|---|
| 2003/0025450 A1 | 2/2003 | Katayama et al. | |
| 2006/0148962 A1 | 7/2006 | Bersted et al. | |
| 2011/0263779 A1 | 10/2011 | Murofushi et al. | |
| 2013/0237660 A1* | 9/2013 | Iwasaki | H01L 33/60 524/548 |
| 2017/0203476 A1 | 7/2017 | Obata et al. | |

FOREIGN PATENT DOCUMENTS

| | | |
|---|---|---|
| CN | 1706052 A | 12/2005 |
| CN | 102245645 A | 11/2011 |
| CN | 106459550 A | 2/2017 |

(Continued)

OTHER PUBLICATIONS

Machine English translation of JP 2016-008230 (Year: 2016).*
Machine English translation of WO 2016/117624 (Year: 2016).*
International Search Report dated Aug. 28, 2018 in PCT/JP2018/024960 filed on Jun. 29, 2018, citing documents AA-AC and AH-AO therein, 2 pages.
Indonesian Office Action dated Jul. 27, 2021 in Indonesian Patent Application No. P00201912363, 6 pages.

(Continued)

*Primary Examiner* — Jessica M Roswell
(74) *Attorney, Agent, or Firm* — Oblon, McClelland, Maier & Neustadt, L.L.P.

(57) ABSTRACT

The present invention provides a thermosetting material, which contains the following components (A) to (C) and which, when measured with a rotational viscometer at a constant shear rate (JIS K7117-2:1999), exhibits a viscosity at 25° C. and 10 s$^{-1}$ of 5 Pa·s or more and 200 Pa·s or less and, when measured with a rotational viscometer at a constant shear rate in the same manner as above, exhibits a viscosity at 25° C. and a shear rate of 100 s$^{-1}$ of 0.3 Pa·s or more and 50 Pa·s or less. (A): a (meth) acrylate compound in which a substituted or unsubstituted alicyclic hydrocarbon group having 6 or more carbon atoms is ester-bonded, and which, when measured with a rotational viscometer at a constant shear rate in the same manner as above, exhibits a viscosity of 5 to 300 mPa·s as a viscosity measured at 25° C. and 10 to 100 s$^{-1}$; (B): spherical silica; and (C): a black pigment.

14 Claims, 4 Drawing Sheets

(56) References Cited

FOREIGN PATENT DOCUMENTS

| JP | 7-251525 A | 10/1995 |
|---|---|---|
| JP | 2556821 Y2 | 12/1997 |
| JP | 2002-194039 A | 7/2002 |
| JP | 2003-46138 A | 2/2003 |
| JP | 3613041 B2 | 1/2005 |
| JP | 2006-503160 A | 1/2006 |
| JP | 2007-234767 A | 9/2007 |
| JP | 2010-157638 A | 7/2010 |
| JP | 2012-131074 A | 7/2012 |
| JP | 2013-79327 A | 5/2013 |
| JP | 2014-80503 A | 5/2014 |
| JP | 2015-89922 A | 5/2015 |
| JP | 2016-8230 A | 1/2016 |
| JP | 2016-222761 A | 12/2016 |
| JP | 2016-224319 A | 12/2016 |
| KR | 10-2011-0104048 | 9/2011 |
| KR | 10-2017-0023787 | 3/2017 |
| TW | 201615727 A | 5/2016 |
| TW | 201634551 A | 10/2016 |
| WO | WO 2010/071073 A1 | 6/2010 |
| WO | WO 2016/117624 A1 | 7/2016 |

OTHER PUBLICATIONS

Combined Chinese Office Action and Search Report dated Oct. 26, 2021 in Chinese Patent Application No. 201880043436.5, citing documents AO through AT therein, 13 page.
Notice of Reasons for Refusal dated Mar. 16, 2021 in Japanese Patent Application No. 2017-129792 (with English language translation), citing documents AO and AP therein, 7 pages.
Combined Taiwanese Office Action and Search Report dated Dec. 10, 2021 in Taiwanese Patent Application No. 107122768 (with English translation of categories of cited documents), citing documents AO and AP therein, 9 pages.
Chinese Office Action dated Jul. 8, 2022 in Chinese Patent Application No. 201880043436.5, 12 pages.
Official Action dated Mar. 29, 2023, in KR application No. 10-2019-7038352, w/English translation—11 pages.

* cited by examiner (a)  (b)  (c)

CURABLE MATERIAL AND METHOD FOR MOLDING SAID THERMALLY CURABLE MATERIAL

TECHNICAL FIELD

The present invention relates to a thermosetting material and a method for molding the thermosetting material.

BACKGROUND ART

An optical semiconductor light-emitting device utilizing an optical semiconductor, such as a light-emitting diode (LED), that has been widespread in recent years is normally produced by a method in which an optical semiconductor is fixed on a lead frame of a molded body obtained by integrally molding a synthetic resin as a housing material in the shape of a concave on a lead frame, followed by sealing with a sealing material, such as an epoxy resin or a silicone resin.

The LED is used as an LED for a display application capable of securing high visibility even under sunlight, a low reflective optical semiconductor light-emitting device or automotive head light for a sensor such that its presence is not obtrusive, and the like.

As characteristics required therefor, there are requirements such that a contrast ratio that is a ratio between a bright luminance when the LED emits light (when lighting) and a dark luminance when the LED does not emit (when non-lighting) is large; and that the reflectivity is low.

As a technology for imparting these functions, there is proposed a method in which in order to make the film thickness uniform, a dark light absorption layer is formed on the light emission observation surface of a package molded body except for a light-emitting section by a screen printing method or hot stamping method (see PTL 1).

In addition, there are proposed a method of providing a light absorption layer composed of an oily ink on an upper surface of a transparent resin formed on, from the upper surface of an LED to the upper surface side of a substrate (see PTL 2); and a light-emitting device in which a light reflective first covering member and a light absorptive second covering member are provided so as to surround the side face of a light transmissive member and a light-emitting element (see PTL 3).

Furthermore, there is proposed a method in which by using a material having a blackish pigment dispersed in a housing section, a reflective luminance when non-lighting is made low, thereby realizing contrast ratio and low reflectivity (PTL 4). But, there is involved such a problem that when applied to a light source requiring light emission at a high luminance, sufficient durability is not obtained.

CITATION LIST

Patent Literation

PTL 1: JP 3613041 B
PTL 2: JP 7-251525 A
PTL 3: JP 2010-157638 A
PTL 4: JP 2556821 Y

SUMMARY OF INVENTION

Technical Problem

However, as characteristics required, any thermosetting material for housing material, which is satisfied such that a contrast ratio that is a ratio between a bright luminance when the LED emits light (when lighting) and a dark luminance when the LED does not emit (when non-lighting) is large; and that the reflectivity is low, has not yet been obtained.

An object of the present invention is to provide a thermosetting material capable of molding a housing section which on the occasion of sealing a light-emitting element section on a lead frame of a sealant of a light-emitting element, prevents spreading of the sealant and leakage of light to the lateral direction, has low reflectivity when non-lighting and a large contrast ratio between lighting and non-lighting, and has excellent heat resistance and light resistance. Another object of the present invention is to provide a thermosetting material which on the occasion of molding, prevents generation of an unfilled section and a void in the obtained molded article, suppresses generation of a burr, and has excellent continuous moldability. A still another object of the present invention is to provide a thermosetting material having excellent storability at normal temperature.

Solution to Problem

In accordance with the present invention, the following thermosetting materials [1] to [14] and so on are provided.
[1] A thermosetting material, which contains the following components (A) to (C) and which, when measured with a rotational viscometer at a constant shear rate (JIS K7117-2:1999), exhibits a viscosity of 5 Pa·s or more and 200 Pa·s or less as a viscosity measured at 25° C. and 10 s$^{-1}$ and, when measured with a rotational viscometer at a constant shear rate in the same manner as above, exhibits a viscosity of 0.3 Pa·s or more and 50 Pa·s or less as a viscosity measured at 25° C. and a shear rate of 100 s$^{-1}$:
 (A) a (meth)acrylate compound in which a substituted or unsubstituted alicyclic hydrocarbon group having 6 or more carbon atoms is ester-bonded, and which, when measured with a rotational viscometer at a constant shear rate in the same manner as above, exhibits a viscosity of 5 to 300 mPa·s as a viscosity measured at 25° C. and 10 to 100 s$^{-1}$;
 (B) spherical silica; and
 (C) a black pigment.
[2] The thermosetting material as set forth in the above [1], wherein the content of the component (B) is from 30 to 97% by mass, and the content of the component (C) is from 0.1 to 10% by mass based on 100% by mass of the sum total of the components (A) to (C).
[3] The thermosetting material as set forth in the above [1] or [2], wherein the component (A) is a (meth)acrylate compound in which at least one alicyclic hydrocarbon group selected from a substituted or unsubstituted adamantyl group, a substituted or unsubstituted norbornyl group, a substituted or unsubstituted isobornyl group, and a substituted or unsubstituted dicyclopentanyl group is ester-bonded.
[4] The thermosetting material as set forth in any of the above [1] to [3], wherein the component (C) is any of a metal oxide pigment or a composite metal oxide pigment containing at least one metal selected from chromium (Cr), cobalt (Co), nickel (Ni), iron (Fe), manganese (Mn), and copper (Cu); a carbon pigment inclusive of activated carbon and carbon black; a mixed organic pigment having been made black upon mixing various organic pigments inclusive of aniline black; and a titanium-based black pigment represented by $TiO_x$ or $TiO_xN_y$.

[5] The thermosetting material as set forth in any of the above [1] to [4], further containing at least one component selected from the group consisting of the following (D) to (F), wherein the content of the component (A) is from 1 to 15% by mass, and the content of the component (B) is from 10 to 90% by mass based on 100% by mass of the sum total of the components (A) to (F):
- (D) (meth)acrylic acid or a monofunctional (meth)acrylate compound having a polar group;
- (E) a monofunctional (meth)acrylate compound other than the components (A) and (D); and
- (F) a polyfunctional (meth)acrylate compound other than the component (A).

[6] The thermosetting material as set forth in any of the above [1] to [5], wherein the spherical silica is one subjected to a surface treatment with a (meth)acrylsilane.

[7] The thermosetting material as set forth in any of the above [1] to [6], wherein the spherical silica has an average particle diameter of 0.1 to 100 μm.

[8] The thermosetting material as set forth in any of the above [1] to [7], further containing the following component (G):
- (G) at least one nano particle selected from silver, gold, silicon, silicon carbide, silica, aluminum oxide, copper oxide, iron oxide, cobalt oxide, titanium oxide, titanium nitride, titanium oxynitride, titanium carbide, zinc oxide, zirconium oxide, cerium oxide, ITO (indium tin oxide), ATO (antimony trioxide), hydroxyapatite, graphene, graphene oxide, single-walled carbon nanotube, multi-walled carbon nanotube, fullerene, diamond, and mesoporous carbon.

[9] A method for molding a thermosetting material, which includes:
- Step 1: a step of supplying the thermosetting material as set forth in any of the above [1] to [8] into a plunger;
- Step 2: a step of filling the thermosetting material supplied in the plunger in a cavity within a mold by the plunger;
- Step 3: a step of thermally curing the thermosetting material in the cavity; and
- Step 4: a step of taking out the thermally cured thermosetting material.

[10] The method for molding a thermosetting material as set forth in the above [9], wherein a mold temperature of the cavity is 100° C. or higher and 180° C. or lower.

[11] The method for molding a thermosetting material as set forth in the above [9] or [10], wherein in the step 2, the thermosetting material is filled in the cavity within the mold through a flow channel having a temperature controlled to 50° C. or lower.

[12] The method for molding a thermosetting material as set forth in any of the above [9] to [11], wherein a filling apparatus to be used in the step 2 is provided with a gate system which shuts off flowing of a curable liquid and delivery and receipt of heat, in the flow channel between the plunger and the cavity.

[13] The method for molding a thermosetting material as set forth in the above [12], wherein
- in the step 2, a gate of the gate system is opened to fill the thermosetting material in the cavity within the mold; and
- in the step 3, after starting the curing, an injection pressure of the thermosetting material is increased to carry out pressure holding before completion of curing, and after completion of the pressure holding, the gate of the gate system is closed to complete the thermal curing.

[14] The method for molding a thermosetting material as set forth in any of the above [9] to [13], wherein the step 2 and the step 3 are conducted within 0.2 minutes to 3 minutes.

Advantageous Effects of Invention

In accordance with the present invention, it is possible to provide a thermosetting material which on the occasion of molding a housing section in a lead frame, is able to prevent generation of an unfilled section and a void in the obtained molded article and suppress generation of a burr, and has excellent continuous moldability.

In accordance with the present invention, it is also possible to provide a thermosetting material capable of molding a housing section which on the occasion of sealing a light-emitting element section on a lead frame of a sealant of a light-emitting element, prevents spreading of the sealant and leakage of light to the lateral direction, has low reflectivity when non-lighting and a large contrast ratio between lighting and non-lighting, and has excellent heat resistance and light resistance.

In addition, in accordance with the present invention, it is possible to provide a method for molding a thermosetting material which on the occasion of molding a housing section on a lead frame, prevents generation of an unfilled section and a void in the obtained molded article, suppresses generation of a burr, and has excellent continuous moldability.

Furthermore, in accordance with the present invention, it is possible to provide a thermosetting material having excellent storability at normal temperature.

REFERENCE SIGNS LIST

Figure 1:
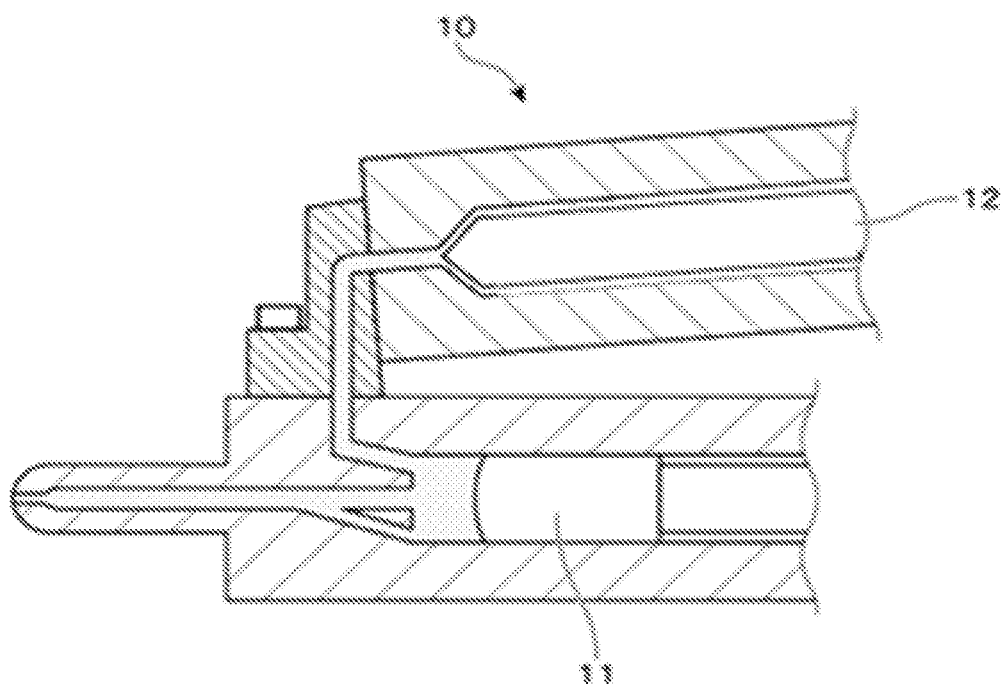
FIG. 1 is a diagrammatic cross-sectional view of a filling apparatus which can be used for an injection molding method of a thermosetting resin of the present invention.

10: Filling apparatus
11: Plunger
20: Mold
21: Cavity
232: Cavity section
233: Knockout pin
240: Decompression tube
224: Elastic member
238: Elastic member
510, 610: Lead frame
520, 620: Substrate for optical semiconductor element mounting
521, 621: Housing material
530, 630: Optical semiconductor light-emitting device
531, 631: Optical semiconductor element
532, 632: Wire
533, 633: Transparent sealing resin
534, 634: Fluorescent material

DESCRIPTION OF EMBODIMENTS

[Thermosetting Material]

The thermosetting material of the present invention contains the following components (A) to (C), and the viscosity at 25° C. and $10\ s^{-1}$ is 5 Pa·s or more and 200 Pa·s or less and the viscosity at 25° C. and a shear rate of $100\ s^{-1}$ is 0.3 Pa·s or more and 50 Pa·s or less:

(A) a (meth)acrylate compound in which a substituted or unsubstituted alicyclic hydrocarbon group having 6 or more carbon atoms is ester-bonded, and which exhibits a viscosity of 5 to 300 mPa·s as a viscosity measured at 25° C. and a shear rate of 10 to $100\ s^{-1}$;
(B) spherical silica; and
(C) a black pigment.

In the present invention, the viscosity at a specified shear rate is one to be measured with a rotational viscometer at a constant shear rate in conformity with JIS K7117-2:1999 (hereinafter the same).

In the thermosetting material of the present invention (hereinafter occasionally referred to as "thermosetting resin composition of the present invention" or simply as "composition of the present invention"), in the case where the viscosity of the composition containing the aforementioned components (A) to (C) is regulated to 5 Pa·s or more and 200 Pa·s or less, preferably 10 Pa·s or more and 150 Pa·s or less, and more preferably 15 Pa·s or more and 100 Pa·s or less in terms of a viscosity at 25° C. and a shear rate of $10\ s^{-1}$ and to 0.3 Pa·s or more and 50 Pa·s or less, preferably 0.5 Pa·s or more and 40 Pa·s or less, and more preferably 1 Pa·s or more and 30 Pa·s or less in terms of a viscosity at 25° C. and a shear rate of $100\ s^{-1}$, excellent continuous moldability is revealed, and generation of a burr in the obtained molded article can be suppressed.

In the case where the viscosity at each of the shear rates does not satisfy the lower limit and is low, there is a concern that a large quantity of the burr is generated, and a deburring work is generated on the molding surface, resulting in poor appearance on the product; and hence, such is not desired. On the other hand, in the case where the viscosity exceeds the upper limit and is high, there is a concern that the molded article becomes unfilled, resulting in poor appearance on the product; and hence, such is not desired.

The viscosity at 25° C. and a shear rate of $100\ s^{-1}$ and the viscosity at 25° C. and a shear rate of $10\ s^{-1}$ are corresponding to the first half and the second half of injecting the material into the cavity, respectively. In the case where each of the values is low, the burr is generated in each of the states, whereas in the case where each of the values is high, unfilling is generated in each of the states. Therefore, the viscosities at the both shear rates are allowed to fall within the aforementioned ranges, respectively.

By appropriately regulating the blending amount of each of the components which the composition contains, it is possible to allow the viscosities of the composition to fall within the aforementioned ranges, respectively. In addition, the shear rate of the composition can be confirmed with a viscoelasticity measuring apparatus.

Each of the components which the composition of the present invention contains is hereunder described.

The composition of the present invention contains, as the component (A), a (meth)acrylate compound in which a substituted or unsubstituted alicyclic hydrocarbon group having 6 or more carbon atoms is ester-bonded, and which, when measured with a rotational viscometer at a constant shear rate (JIS K7117-2:1999), exhibits a viscosity of 5 to 300 mPa·s as a viscosity measured at 25° C. and a shear rate of 10 to $100\ s^{-1}$ (the (meth)acrylate compound will be hereinafter occasionally referred to as "compound (A)").

In view of the fact that the compound (A) gives a polymer having a high glass transition point, when the compound (A) is contained in the composition, in the case where the composition is used as a raw material of a housing material for optical semiconductor, heat resistance and light resistance can be improved.

In the present invention, the expression "(meth)acrylate compound" means an acrylate compound or a methacrylate compound. In addition, the expression "(meth)acrylic acid" means acrylic acid or methacrylic acid.

The carbon number of the alicyclic hydrocarbon group of the compound (A) is 6 or more, preferably 6 to 30, and more preferably 7 to 15.

The alicyclic hydrocarbon group having 6 or more carbon atoms may have a substituent, and examples of the substituted or unsubstituted alicyclic hydrocarbon group having 6 or more carbon atoms include a substituted or unsubstituted adamantyl group, a substituted or unsubstituted norbornyl group, a substituted or unsubstituted isobornyl group, a substituted or unsubstituted dicyclopentanyl group, and a substituted or unsubstituted cyclohexyl group.

Furthermore, the component (A) is preferably a (meth) acrylate compound in which at least one alicyclic hydrocarbon group selected from a substituted or unsubstituted adamantyl group, a substituted or unsubstituted norbornyl group, a substituted or unsubstituted isobornyl group, and a substituted or unsubstituted dicyclopentanyl group is ester-bonded.

That is, preferably, examples of the compound (A) include a (meth)acrylate compound (I) having an adamantyl group, a (meth)acrylate compound (II) having an isobornyl group, a (meth)acrylate compound (III) having a norbornyl group, and a (meth)acrylate compound (IV) having a dicyclopentanyl group, as represented by the following general formulae.

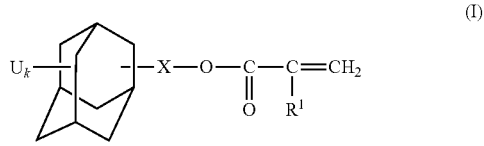

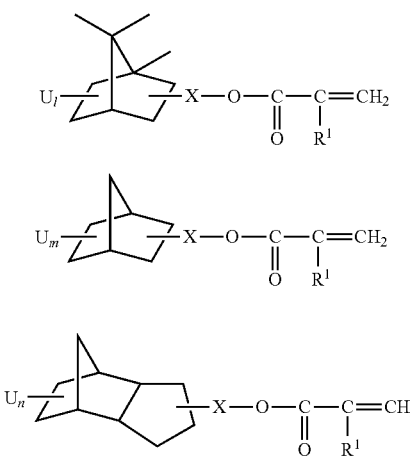

In the formulae (I), (II), (III), and (IV), $R^1$'s each independently represent a hydrogen atom or a methyl group.

X's each independently represent a single bond, an alkylene group having 1 to 4 carbon atoms, or an oxyalkylene group having 1 to 4 carbon atoms. Examples of the alkylene group having 1 to 4 carbon atoms include a methylene group, an ethylene group, a trimethylene group, a propylene group, a tetramethylene group, a butylene group, and a 2-methyltrimethylene group. Examples of the oxyalkylene group having 1 to 4 carbon atoms include an oxymethylene group, an oxyethylene group, an oxypropylene group, and an oxybutylene group. Of these X's, a single bond is preferred from the viewpoint of heat resistance.

U represents a hydrogen atom, an alkyl group having 1 to 4 carbon atoms, a halogen atom, a hydroxy group, or a derivative formed when two U's are taken together. k represents an integer of 1 to 15. l represents an integer of 1 to 8. m represents an integer of 1 to 11. n represents an integer of 1 to 15.

In the case where plural U's are present, the plural U's may be the same as or different from each other.

The compound (A) is more preferably adamanyl methacrylate, 1-norbornyl methacrylate, 1-isobornyl methacrylate, or 1-dicyclopentanyl methacrylate; and still more preferably 1-adamanyl methacrylate, 1-norbornyl methacrylate, or 1-isobornyl methacrylate. These compounds have a viscosity at 25° C. of 5 to 300 mPa·s.

The (meth)arylate compound in which a substituted or unsubstituted alicyclic hydrocarbon group having 6 or more carbon atoms is ester-bonded may be used alone or may be used in combination of two or more thereof.

When measured with a rotational viscometer at a constant shear rate (JIS K7117-21999), the compound (A) exhibits a viscosity of 5 to 300 mPa·s, more preferably 5 to 200 mPa·s, and still more preferably 5 to 100 mPa·s as a viscosity measured at 25° C. and a shear rate of 10 to 100 sd. By blending the compound (A) having such a low viscosity in the composition, the filling properties with the spherical silica and the black pigment can be enhanced.

[Component (B): Spherical Silica]

The composition of the present invention contains spherical silica ($SiO_2$) as the component (B).

As for the black pigment (C), such as carbon black, titanium black, and titanium oxide as mentioned later, though its amount at which it can be used so as to readily precipitate in the liquid is limited, by using spherical silica in combination, the content of the inorganic material in the composition can be more increased, and material strength, shielding rate, heat resistance, and light resistance can be more improved.

Fluidity of the composition can be kept, and on the occasion of molding, filling properties can be enhanced.

When measured by means of laser diffraction, an average particle diameter of the spherical silica is, for example, 0.1 to 100 μm, preferably 0.5 to 70 μm, and more preferably 1 to 50 μm. According to this, filling properties of the spherical silica can be enhanced.

It is preferred that the spherical silica is subjected to a surface treatment (preferably a (meth)acrylsilane surface treatment, and especially preferably an acrylsilane surface treatment).

By allowing the hydroxy group of the surface of the spherical silica to react with a silane coupling agent (especially, an acrylic silane coupling agent) to undergo organic modification, wetting properties of the spherical silica can be improved; in the composition, dispersibility of the spherical silica in the organic components (component (A) and optional components (D), (E), and (F)) can be improved; and strength of a cured product can be improved.

The content of the spherical silica in the composition is, for example, 30 to 97% by mass, preferably 50 to 97% by mass, and more preferably 85 to 97% by mass based on 100% by mass of the sum total of the components (A), (B), and (C).

When the content of the spherical silica in the composition is less than 30% by mass relative to the aforementioned total mass %, the composition becomes is low in the viscosity, and suppression of generation of a burr and storability at normal temperature are impaired, so that there is a concern that the material strength as physical properties cannot be secured; whereas when it is more than 97% by mass, the composition is high in the viscosity, and preparation of a uniform cuing liquid and fluidity are impaired, so that there is a concern that molding cannot be achieved.

[Component (C): Black Pigment]

The composition of the present invention contains a black pigment as the component (C).

Specific examples of the black pigment include a metal oxide pigment or a composite metal oxide pigment containing at least one metal selected from chromium (Cr), cobalt (Co), nickel (Ni), iron (Fe), manganese (Mn), and copper (Cu); a carbon pigment, such as activated carbon and carbon black; a mixed organic pigment having been made black upon mixing various organic pigments, aniline black; a titanium-based black pigment represented by $TiO_x$ or $TiO_xN_y$; and a dye. Especially, insulating carbon black, a titanium-based black pigment represented by $TiO_x$ $TiN_y$, or $TiO_xN_y$, titanium black, and titanium oxide can be suitably adopted. Here, x and y are each an integer of 0 or more. Besides, a blackish plate-like filler, for example, mica, can be used. The black pigment can be used either alone or in combination of two or more thereof.

Examples of a crystal form of titanium oxide include a rutile form and an anatase type. However, the anatase form has a photocatalytic function, and therefore, there is a concern that it deteriorates the resin. Thus, in the present invention, a rutile form is preferred.

From the viewpoint of dispersibility of the black pigment in the composition, a primary average particle diameter of the black pigment is preferably 0.01 to 20 μm, more preferably 0.01 to 10 μm, and still more preferably 0.04 to 5 μm. The average particle diameter can be determined in terms of D50 in the particle size distribution measurement by the laser light diffraction method.

The black pigment may be a hollow particle. In the case where the black pigment is a hollow particle, a visible light having passed through an outer shell of the hollow particle is absorbed in the hollow section, and therefore, in order to enhance an absorptance in the hollow section, it is preferred that a difference in refractive index between a portion constituting the hollow particle and a gas existent in the interior of the hollow particle is large. Though the gas existent in the interior of the hollow particle is typically air, it may also be an inert gas, such as nitrogen and argon, and a vacuum may be adopted, too.

The black pigment may be appropriately subjected to a surface treatment with a silicon compound, an aluminum compound, an organic material, or the like. Examples of the surface treatment include a (meth)acrylsilane treatment, an alkylation treatment, a trimethylsilylation treatment, a silicone treatment, and a treatment with a coupling agent.

The content of the black pigment in the composition is, for example, 0.1 to 10% by mass, preferably 0.2 to 5% by mass, and more preferably 0.3 to 3% by mass based on 100% by mass of the sum total of the components (A), (B), and (C).

When the content of the black pigment in the composition is less than 0.1% by mass relative to the aforementioned total mass %, there is a concern that a reflectance becomes high, whereas when it is more than 10% by mass, the composition becomes high in the viscosity, so that there is a concern that mixing properties and fluidity (moldability) of the material are impaired.

The composition of the present invention may further contain a polymerizable acrylate compound other than the compound (A), or the like as an optional component. Examples of the optional component include at least one selected from the group consisting of the following components (D), (E), and (F).

Component (D): (meth)acrylic acid or a monofunctional (meth)acrylate compound having a polar group
Component (E): a monofunctional (meth)acrylate compound other than the components (A) and (D)
Component (F): a polyfunctional (meth)acrylate compound other than the component (A)

The component (D), the component (E), and the component (F) are hereinafter occasionally referred to as "compound (D)", "compound (E)", and "compound (F)", respectively.

The total content of the compounds (A), (D), (E), and (F) in the composition of the present invention is preferably 1 to 40% by mass, more preferably 5 to 30% by mass, and still more preferably 8 to 20% by mass based on 100% by mass of the sum total of the components (A) to (F).

It is preferred that the content of the component (A) is 1 to 15% by mass, the content of the component (B) is 10 to 90% by mass, and the content of the component (C) is 0.1 to 10% by mass based on 100% by mass of the sum total of the components (A) to (F).

[Component (D): (Meth)Acrylic Acid or a Monofunctional (Meth)Acrylate Compound Having a Polar Group]

The compound (D) is (meth)acrylic acid or a monofunctional (meth)acrylate compound having a polar group. The compound (D) is not one in which an alicyclic hydrocarbon group having 6 or more carbon atoms is bonded and does not overlap the compound (A).

The compound (D) has polarity, and therefore, when contained in the composition, the compound (D) forms a hydrogen bond or the like together with a metal surface having polarity, or the like, whereby adhesion is improved, and wetting properties are improved owing to the presence of the polar group. Though an alkylene glycol group may possibility contribute to giving the adhesion, it should be construed that an alkylene glycol (meth)acrylate is not included in the compound (D).

Examples of the monofunctional (meth)acrylate compound having a polar group include a (meth)acrylate compound in which a substituent containing an atom other than carbon and hydrogen is ester-bonded, and examples of the substituent include a hydroxy group, an epoxy group, a glycidyl ether group, a tetrahydrofurfuryl group, an isocyanate group, a carboxy group, an alkoxysilyl group, a phosphate group, a lactone group, an oxetanyl group, a tetrahydropyranyl group, and an amino group.

Specific examples of the monofunctional (meth)acrylate compound having a polar group include 2-hydroxyethyl (meth)acrylate, 2-hydroxypropyl (meth)acrylate, 2-hydroxybutyl (meth)acrylate, 4-hydroxybutyl (meth)acrylate (for example, a product name: 4-HBA, manufactured by Nihon Kasei Co., Ltd.), cyclohexanedimethanol mono (meth)acrylate (for example, a product name: CHMMA, manufactured by Nihon Kasei Co., Ltd.), glycidyl (meth) acrylate, 4-hydroxybutyl acrylate glycidyl ether (for example, a product name: 4-HBAGE, manufactured by Nihon Kasei Co., Ltd.), tetrahydrofurfuryl (meth)acrylate, 2-isocyanatoethyl (meth)acrylate, 2-(meth)acryloyloxyethyl succinate, 2-(meth)acryloyloxyethyl hexahydrophthalate, 3-(meth)acryloxypropyltrimethoxysilane, 3-(meth)acryloxypropylmethyldimethoxysilane, 3-(meth)acryloxypropyltriethoxysilane, 3-(meth)acryloxypropylmethyldiethoxysilane, 2-(meth)acryloyloxyethyl phosphate, bis(2-(meth) acryloyloxyethyl) phosphate, KAYAMER PM-2 and KAYAMER PM-21 (trade names, manufactured by Nippon Kayaku Co., Ltd.), γ-butyrolactone (meth)acrylate, (3-methyl-3-oxetanyl) (meth)acrylate, (3-ethyl-3-oxetanyl) (meth)acrylate, dimethylaminoethyl (meth)acrylate, and diethylaminoethyl (meth)acrylate.

In the present invention, as the compound (D), one selected from the aforementioned (meth)acrylic acid and the aforementioned (meth)acrylate compound having a polar group may be used alone or may be used in combination of two or more thereof.

From the viewpoint of adhesion, the content of the compound (D) in the composition of the present invention is preferably 1 to 40% by mass, more preferably 5 to 33% by mass, and still more preferably 7 to 25% by mass based on 100% by mass of the sum total of the compounds (A), (D), (E), and (F).

[Component (E): Monofunctional (Meth)Acrylate Compound Other than the Components (A) and (D)]
[Component (F): Polyfunctional (Meth)Acrylate Compound Other than the Component (A)]

The compound (E) is a monofunctional (meth)acrylate compound other than the compounds (A) and (D). In the case where the composition of the present invention contains the compound (E), the viscosity and the hardness of a cured product can be regulated, and generation of a crack, or the like can be suppressed.

The compound (F) is a polyfunctional (meth)acrylate compound other than the compound (A). From the viewpoint of mechanical strength and curing rate, the polyfunctional (meth)acrylate compound other than the compounds (A), (D), and (E) may be contained in the composition within a range where the effects of the present invention are not impaired.

Examples of the (meth)acrylate compounds (compounds (E) and (F)) other than compounds (A) and (D) include at least one (meth)acrylate compound selected from the group consisting of a (meth)acrylate-modified silicone oil, a (meth)acrylate having an aliphatic hydrocarbon group, a polyalkylene glycol (meth)acrylate having a number average molecular weight of 400 or more, a urethane acrylate, an epoxy acrylate, and a polyester acrylate. Among the foregoing compounds, the monofunctional (meth)acrylate compound can be selected and used as the compound (E). In addition, among the foregoing compounds, the polyfunctional (meth)acrylate compound can be selected and used as the compound (F).

The (meth)acrylate-modified silicone oil which can be used in the present invention is a compound having an acrylic group and/or a methacrylic group in a terminal(s) thereof, and preferably containing a dialkylpolysiloxane in a skeleton thereof. In many cases, this (meth)acrylate-modified silicone oil is a modified product of dimethylpolysiloxane; however, all or a part of alkyl groups in the dialkylpolysiloxane skeleton may be substituted with a phenyl group or an alkyl group other than a methyl group in place of the methyl group. Examples of the alkyl group other than the methyl group include an ethyl group and a propyl group. As a commercially available product of such a compound, a one-terminal reactive silicone oil (for example, X-22-174DX, X-22-2426, and X-22-2475), a both-terminal reactive silicone oil (for example, X-22-164A, X-22-164C, and X-22-164E) (all of them are a trade name, manufactured by Shin-Etsu Chemical Co., Ltd.), a methacrylate-modified silicon oil (for example, BY16-152D, BY16-152, and BY16-152C) (all of them are a trade name, manufactured by Dow Corning Toray Co., Ltd.), and so on can be used.

As the (meth)acrylate-modified silicone oil, a polydialkylsiloxane having an acryloxyalkyl terminal or a methacryloxyalkyl terminal can also be used. Specifically, examples thereof include methacryloxypropyl-terminated polydimethylsiloxane, (3-acryloxy-2-hydroxypropyl)-terminated polydimethylsiloxane, an ABA-type triblock copolymer composed of acryloxy-terminated ethylene oxide dimethylsiloxane (block A) and ethylene oxide (block B), and methacryloxypropyl-terminated branched polydimethylsiloxane.

The (meth)acrylate having an aliphatic hydrocarbon group which can be used in the present invention is a compound in which a (meth)acrylate group is bonded to a residue resulting from removing a hydrogen atom from an aliphatic hydrocarbon compound.

As the aliphatic hydrocarbon compound capable of deriving the (meth)acrylate having an aliphatic hydrocarbon group which can be used in the present invention, an alkane is preferred, and from the viewpoint of physical properties of the cured product of the present invention, an alkane having 12 or more carbon atoms is more preferred.

In the (meth)acrylate having an aliphatic hydrocarbon group which can be used in the present invention, the number of (meth)acrylate group is not particularly limited, and it may be either one or a plural number. In the case where the number of (meth)acrylate group is one, the aliphatic hydrocarbon group is preferably an alkyl group, and more preferably a linear alkyl group having 12 or more carbon atoms (preferably 12 to 24 carbon atoms, and more preferably 12 to 18 carbon atoms). In the case where the number of (meth)acrylate group is 2, the aliphatic hydrocarbon group is preferably an alkylene group, and more preferably a linear alkylene group having 12 or more carbon atoms (preferably 12 to 24 carbon atoms, and more preferably 12 to 18 carbon atoms).

Specific examples of the alkyl group having 12 or more carbon atoms include a dodecyl group (inclusive of a lauryl group), a tridecyl group, a tetradecyl group, a hexadecyl group, an octadecyl group (inclusive of a stearyl group), an eicosyl group, a triacontyl group, and a tetracontyl group. The alkyl group and the alkylene group each having 12 or more carbon atoms may also be an alkyl group and an alkylene group derived from a hydride of a polymer, such as polybutadiene and polyisoprene, respectively. Specific examples of the alkylene group having 12 or more carbon atoms include divalent residues resulting from removing a hydrogen atom from the aforementioned alkyl groups.

Specific examples of the (meth)acrylate having an aliphatic hydrocarbon group include lauryl (meth)acrylate, tridecyl (meth)acrylate, tetradecyl (meth)acrylate, hexadecyl (meth)acrylate, stearyl (meth)acrylate, eicosyl (meth)acrylate, triacontyl (meth)acrylate, and tetracontyl (meth)acrylate; or acrylic or methacrylic compounds having a hydrogenated polybutadiene or hydrogenated polyisoprene skeleton, such as hydrogenated polybutadiene di(meth)acrylate and hydrogenated polyisoprene di(meth)acrylate.

By using a polyalkylene glycol (meth)acrylate having a number average molecular weight of 400 or more, the composition of the present invention is able to give a cured product having excellent toughness. In the polyalkylene glycol (meth)acrylate having a number average molecular weight of 400 or more which can be used in the present invention, the number of (meth)acrylate group is not particularly limited, and it may be either one or a plural number.

From the viewpoint of toughness and adhesion as well as the viewpoint of compatibility with the components (A) and (D), the number average molecular weight of the foregoing compound is preferably 400 to 10,000, more preferably 450 to 5,000, and still more preferably 500 to 3,000.

Specific examples of the polyalkylene glycol (meth)acrylate having a number average molecular weight of 400 or more include polyethylene glycol di(meth)acrylate, polypropylene glycol di(meth)acrylate, polybutylene glycol di(meth)acrylate, ethoxylated trimethylolpropane tri(meth)acrylate, and ethoxylated pentaerythritol tetra(meth)acrylate. Of these, from the viewpoint of toughness and adhesion, polyethylene glycol di(meth)acrylate is preferred.

From the viewpoint of light resistance, the urethane acrylate, epoxy acrylate, and polyester acrylate which can be used in the present invention are preferably ones not containing an aromatic group, and from the viewpoint of toughness and compatibility with the components (A) and (D), the number average molecular weight of the foregoing compound is preferably 100 to 100,000, more preferably 500 to 80,000, and still more preferably 1,000 to 50,000.

Besides, specific examples of the monofunctional or polyfunctional (meth)acrylate (compound (E) or (F)) which can be used in the present invention include polyethylene glycol di(meth)acrylate and polypropylene glycol di(meth)acrylate each having a number average molecular weight of less than 400, ethyl (meth)acrylate, n-butyl (meth)acrylate, isobutyl (meth)acrylate, t-butyl (meth)acrylate, isoamyl (meth)acrylate, 2-ethylhexyl (meth)acrylate, isooctyl (meth)acrylate, isodecyl (meth)acrylate, caprolactone (meth)acrylate, ethoxydiethylene glycol (meth)acrylate, methoxytriethylene glycol (meth)acrylate, 2-ethylhexyl diglycol (meth)acrylate, methoxypolyethylene glycol (meth)acrylate, methoxydipropylene glycol (meth)acrylate, polypropylene glycol mono(meth)acrylate, tetrahydrofurfuryl (meth)acrylate, trifluoroethyl (meth)acrylate, ethylene glycol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, neopentyl glycol di(meth)acrylate, ethoxylated neopentyl glycol di(meth)acrylate, propoxylated neopentyl glycol di(meth)acrylate, 1,3-butylene glycol di(meth)acrylate, 1,4-butanediol di(meth)acrylate, 3-methyl-1,5-pentanediol di(meth)acrylate, 1,6-hexanediol di(meth)acrylate, ethoxylated hexanediol di(meth)acrylate, 1,9-nonanediol di(meth)acrylate, 1,10-decanediol di(meth)acrylate, 1,12-dodecanediol dimethacrylate, 2-methyl-1,8-octanediol di(meth)acrylate, glycerin di(meth)acrylate, tricyclodecane dimethanol di(meth)acrylate, a hydroxypivalic acid neopentyl glycol acrylic acid adduct, 2-hydroxy-3-acryloyloxypropyl (meth)acrylate, ethoxylated bisphenol A di(meth)acrylate, propoxylated di(meth)acrylate, ethoxylated hydrogenated bisphenol A di(meth)acrylate, propoxylated hydrogenated di(meth)acrylate, glycerin tri(meth)acrylate, ethoxylated glycerin (meth)acrylate, propoxylated glycerin (meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, pentaerythritol tetra(meth)acrylate, ditrimethylolpropane tetra(meth)acrylate, ethoxylated pentaerythritol tetra(meth)acrylate, dipentaerythritol penta(meth)acrylate, dipentaerythritol hexa(meth)acrylate, and ethoxylated isocyanuric acid tri(meth)acrylate. Besides, epoxy esters may be used, and examples thereof include an ethylene glycol diglycidyl ether methacrylic acid adduct, a propylene glycol diglycidyl ether acrylic acid adduct, a tripropylene glycol diglycidyl ether acrylic acid adduct, a glycerin diglycidyl ether acrylic acid adduct, a hydrogenated bisphenol A diglycidyl ether acrylic acid adduct, an EPO-LIGHT 3002(N) methacrylic acid adduct, a bisphenol A PO 2 mol adduct, a diglycidyl ether acrylic acid adduct, a bisphenol A diglycidyl ether methacrylic acid adduct, and a bisphenol A diglycidyl ether acrylic acid adduct. Besides, there is exemplified ε-caprolactone-modified tris(2-acryloxyethyl) isocyanurate.

In the present invention, as the compound (E), the aforementioned monofunctional (meth)acrylate compounds can be used either alone or in combination of two or more thereof.

From the viewpoint of toughness and adhesion, the content of the compound (E) in the composition of the present invention is preferably 10 to 80% by mass, more preferably 15 to 75% by mass, and still more preferably 20 to 70% by mass based on 100% by mass of the sum total of the compounds (A), (D), (E), and (F).

In the present invention, as the compound (F), the aforementioned polyfunctional (meth)acrylates other than the component (A) can be used either alone or in combination of two or more thereof.

From the viewpoint that the effects of the present invention are not impaired, the content of the compound (F) in the composition of the present invention is preferably 0.1 to 70% by mass, more preferably 0.5 to 40% by mass, and still more preferably 1 to 20% by mass based on 100% by mass of the sum total of the compounds (A), (D), (E), and (F).

Preferably, the composition of the present invention further contains the following component (G).

(G) Nano Particle

In the case where the composition of the present invention contains a nano particle that is the component (G), the viscosity of the composition can be regulated, storage stability at normal temperature of the composition can be kept, and a fault during molding can be minimized.

As the nano particle, at least one selected from silver, gold, silicon, silicon carbide, silica, aluminum oxide, copper oxide, iron oxide, cobalt oxide, titanium oxide, titanium nitride, titanium oxynitride, titanium carbide, zinc oxide, zirconium oxide, cerium oxide, ITO, ATO, hydroxyapatite, graphene, graphene oxide, single-walled carbon nanotube, multi-walled carbon nanotube, fullerene, diamond, and mesoporous carbon is preferred.

Of these, silicon carbide, silica, aluminum oxide, titanium carbide, zinc oxide, and zirconium oxide are more preferred; and from the standpoint that blackness can be kept, silica, aluminum oxide, titanium oxide, titanium nitride, titanium oxynitride, titanium carbide, zinc oxide, and zirconium oxide are still more preferred.

The nano particle can be used either alone or in combination of two or more thereof.

In the present invention, a preferred average particle diameter of the nano particle is 5 to 1,000 nm. The average particle diameter of the nano particle can be measured by the laser diffraction scattering method.

The content of the component (G) in the composition is, for example, 0.03 to 10% by mass, preferably 0.05 to 5% by mass, and more preferably 0.07 to 3% by mass based on 100% by mass of the sum total of the components (A) to (G). When the content of the component (G) is 0.03% by mass or less, stability during storage at normal temperature is poor, and precipitation of the solid component is possibly generated, whereas when it is more than 10% by mass, deterioration of the appearance (transferability) of a molded article is possibly generated.

The components (A), (D), (E), and (F) of the thermosetting composition of the present invention reduce the viscosity of the thermosetting composition, and the components (B), (C), and (G) increase the viscosity of the thermosetting composition.

From the viewpoint of regulating the thermosetting composition so as to have a viscosity at 25° C. and 10 s$^{-1}$ of 5 Pa·s or more and 200 Pa·s or less and a shear rate at 25° C. and 100 s$^{-1}$ of 0.3 Pa·s or more and 50 Pa·s or less, the total content of the components (A), (D), (E), and (F) in the thermosetting composition is preferably 7 to 50% by mass, more preferably 7 to 35% by mass, and still more preferably 8 to 25% by mass based on 100% by mass of the sum total of the components (A) to (G); and the total content of the components (B), (C), and (G) in the thermosetting composition is preferably 50 to 93% by mass, more preferably 65 to 93% by mass, and still more preferably 75 to 92% by mass based on 100% by mass of the sum total of the components (A) to (G). By regulating the viscosity of the thermosetting composition within the aforementioned range, excellent continuous moldability can be revealed, and generation of a burr of the resulting molded article can be suppressed.

The thermosetting composition of the present invention may contain the components (A), (B), and (C) and may further optionally contain at least one selected from the components (D), (E), (F), and (G).

In the thermosetting composition of the present invention, the sum total of the contents of the components (A) to (G) is, for example, 85% by mass or more, 95% by mass or more, or 99% by mass or more, and the thermosetting composition of the present invention may be composed of only the components (A) to (G).

[Additive]

The thermosetting composition of the present invention can contain, in addition to the components (A) to (G), an additive, such as a polymerization initiator, an antioxidant, a photo-stabilizer (UV absorber), a plasticizer, an inorganic filler, a coloring material, an antistatic agent, a lubricating agent, a mold releasing agent, a flame retardant, a levelling agent, and an anti-foaming agent, within a range where the effects of the present invention are not impaired. As these additives, those which are known can be used.

The additives which are suitable for the composition of the present invention are hereunder described.

(Polymerization Initiator)

By polymerizing the composition of the present invention with heat, the cured product can be obtained. In order to promote the polymerization reaction, a polymerization initiator may be contained in the composition. Though the polymerization initiator is not particularly limited, examples thereof include a radical polymerization initiator.

Though the radical polymerization initiator is not particularly limited, examples thereof include a ketone peroxide, a hydroperoxide, a diacyl peroxide, a dialkyl peroxide, a peroxyketal, an alkyl perester (peroxy ester), and a peroxy carbonate.

Specific examples of the ketone peroxide include methyl ethyl ketone peroxide, methyl isobutyl ketone peroxide, acetyl acetone peroxide, cyclohexanone peroxide, and methyl cyclohexanone peroxide.

Specific examples of the hydroperoxide include 1,1,3,3-tetramethylbutyl hydroperoxide, cumene hydroperoxide, t-butyl hydroperoxide, p-menthane hydroperoxide, and diisopropylbenzene hydroperoxide.

Specific examples of the diacyl peroxide include diisobutyryl peroxide, bis-3,5,5-trimethylhexanol peroxide, dilauroyl peroxide, dibenzoyl peroxide, m-toluyl benzoyl peroxide, and succinic acid peroxide.

Specific examples of the dialkyl peroxide include dicumyl peroxide, dimethyl-2,5-di(t-butylperoxy)hexane, 1,3-bis(t-butylperoxyisopropyl)hexane, t-butylcumyl peroxide, di-t-butyl peroxide, di-t-hexyl peroxide, and 2,5-dimethyl-2,5-di(t-butylperoxy)hexyne-3.

Specific examples of the peroxyketal include 1,1-di-t-hexylperoxy-3,3,5-trimethylcyclohexane, 1,1-di-t-hexylperoxycyclohexane, 1,1-di-t-butylperoxy-2-methylcyclohexane, 1,1-di-t-butylperoxycyclohexane, 2,2-di(t-butylperoxy)butane, and butyl 4,4-bis-t-butylperoxypentanoate.

Specific examples of the alkyl perester (peroxy ester) include 1,1,3,3-tetramethylbutylperoxy neodecanoate, α-cumylperoxy neodecanoate, t-butylperoxy neodecanoate, t-hexylperoxy neodecanoate, t-butylperoxy neoheptanoate, t-hexylperoxy pivalate, t-butylperoxy pivalate, 1,1,3,3-tetramethylbutylperoxy-2-ethyl hexanoate, t-amylperoxy-2-ethyl hexanoate, t-butylperoxy-2-ethyl hexanoate, t-butylperoxy isobutyrate, di-t-butylperoxy hexahydroterephthalate, 1,1,3,3-tetramethylbutylperoxy-3,5,5-trimethyl hexanoate, t-amylperoxy-3,5,5-trimethyl hexanoate, t-butylperoxy-3,5,5-trimethyl hexanoate, t-butylperoxy acetate, t-butylperoxy benzoate, dibutylperoxytrimethyl adipate, 2,5-dimethyl-2,5-di-2-ethylhexanoylperoxyhexane, t-hexylperoxy-2-ethyl hexanoate, t-hexylperoxy isopropyl monocarbonate, t-butylperoxy laurate, t-butylperoxy isopropyl monocarbonate, t-butylperoxy-2-ethylhexyl monocarbonate, and 2,5-dimethyl-2,5-di-benzoylperoxyhexane.

Specific examples of the peroxy carbonate include di-n-propylperoxy Bicarbonate, diisopropylperoxy carbonate, di-4-t-butylcyclohexylperoxy carbonate, di-2-ethylhexylperoxy carbonate, di-sec-butylperoxy carbonate, di-3-methoxybutylperoxy dicarbonate, di-2-ethylhexylperoxy dicarbonate, diisopropyloxy dicarbonate, t-amylperoxy isopropyl carbonate, t-butylperoxy isopropyl carbonate, t-butylperoxy-2-ethylhexyl carbonate, and 1,6-bis(t-butylperoxycarboxyloxy)hexane.

In the present invention, the radical polymerization initiator can be used either alone or in combination of two or more thereof.

The content of the radical polymerization initiator in the composition of the present invention is preferably 0.01 to 10 parts by mass, and more preferably 0.1 to 5 parts by mass based on 100 parts by mass of the sum total of the components (A) to (G).

(Antioxidant)

Examples of the antioxidant include a phenol-based antioxidant, a phosphorus-based antioxidant, a sulfur-based antioxidant, a vitamin-based antioxidant, a lactone-based antioxidant, and an amine-based antioxidant.

Examples of the phenol-based antioxidant include tetrakis[methylene-3-(3,5-di-t-butyl-4-hydroxyphenyl)propionato]methane, stearyl β-(3,5-di-t-butyl-4-hydroxyphenyl)propionate, 1,3,5-trimethyl-2,4,6-tris(3,5-di-t-butyl-4-hydroxybenzyl)benzene, tris(3,5-di-t-butyl-4-hydroxybenzyl) isocyanurate, tris[(3,5-di-t-butyl-4-hydroxyphenyl)propionyloxyethyl] isocyanurate, 2,6-di-t-butyl-4-methylphenol, 3,9-bis[1,1-dimethyl-2-{β-(3-t-butyl-4-hydroxy-5-methylphenyl)propionyloxy}ethyl]-2,4,8,10-tetraoxaspiro [5,5]undecane, and tris(2,6-dimethyl-3-hydroxy-4-t-butylbenzyl)isocyanurate. Commercially available products, for example, IRGANOX 1010, IRGANOX 1076, IRGANOX 1330, IRGANOX 3114, IRGANOX 3125, and IRGANOX 3790 (all of them are manufactured by BASF SE); CYANOX 1790 (manufactured by Cyanamid Corporation); and SUMILIZER BHT and SUMILIZER GA-80 (all of them are manufactured by Sumitomo Chemical Co., Ltd.) (all of which are a trade name), can be used.

Examples of the phosphorus-based antioxidant include tris(2,4-di-t-butylphenyl) phosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine, cyclic neopentanetetrayl bis(2,6-di-t-butyl-4-methylphenyl) phosphite, and distearyl pentaerythritol diphosphite. Commercially available products, for example, IRGAFOS 168, IRGAFOS 12, and IRGAFOS 38 (all of them are manufactured by BASF SE); ADK STAB 329K, ADK STAB PEP36, and ADK STAB PEP-8 (all of them are manufactured by ADEKA Corporation); Sandstab P-EPQ (manufactured by Clariant SE); and Weston 618, Weston 619G, and Weston 624 (all of them are manufactured by GE Company) (all of which are a tradename), can be used.

Examples of the sulfur-based antioxidant include dilauryl thiodipropionate, distearyl thiodipropionate, dimyristyl thiodipropionate, lauryl stearyl thiodipropionate, pentaerythritol tetrakis(3-dodecylthiopropionate), and pent aerythritol tetrakis(3-laurylthiopropionate). Commercially available products, for example, DSTP "Yoshitomi", DLTP "Yoshitomi", DLTOIB, and DMTP "Yoshitomi" (all of them are manufactured by API Corporation); Seenox 412S (manufactured by SHIPRO KASEI KAISHA, Ltd.); Cyanox 1212 (manufactured by Cyanamid Corporation); and SUMILIZER TP-D (manufactured by Sumitomo Chemical Co., Ltd.) (all of which are a tradename), can be used.

Examples of the vitamin-based antioxidant include tocopherol and 2,5,7,8-tetramethyl-2-(4',8',12'-trimethyltridecyl)coumaron-6-ol. Commercially available products, for example, IRGANOX E201 (manufactured by BASF SE), can be used.

As the lactone-based antioxidant, those described in JP 7-233160 A and JP 7-247278 A can be used. In addition, HP-136 (a tradename, manufactured by BASF SE, a chemical name: 5,7-di-t-butyl-3-(3,4-dimethylphenyl)-3H-benzofuran-2-one) and the like can also be used.

Examples of the commercially available amine-based antioxidant include IRGASTAB FS 042 (manufactured by BASF SE) and GENOX EP (a chemical name: dialkyl-N-methylamine oxide, manufactured by Crompton Corporation) (all of which are a tradename).

These antioxidants can be used either alone or in combination of two or more thereof. From the viewpoint that the effects of the present invention are not impaired, the content of the antioxidant in the composition of the present invention is preferably 0.005 to 5 parts by mass, and more preferably 0.02 to 2 parts by mass based on 100 parts by mass of the sum total of the components (A) to (G).

(Photo-Stabilizer)

Though any photo-stabilizer, such as a UV absorber and a hindered amine-based photo-stabilizer can be optionally used, a hindered amine-based photo-stabilizer, is preferred.

Specific examples of the hindered amine-based photo-stabilizer include ADK STAB LA-52, LA-57, LA-62, LA-63, LA-67, LA-68, LA-77, LA-82, LA-87, and LA-94 (all of them are manufactured by ADEKA Corporation); Tinuvin 123, 144, 440, 662, 765, and 770DF, Tinuvin XT 850 FF, Tinuvin XT 855 FF, and Chimassorb 2020, 119, and 944 (all of them are manufactured by BASF SE); Hostavin N30 (manufactured by Hoechst SE); Cyasorb UV-3346 and UV-3526 (all of them are manufactured by Cytech, Inc.); Uval 299 (manufactured by GLC Corporation); and Sanduvor PR-31 (manufactured by Clariant SE) (all of which are a tradename).

Specific examples of the UV absorber include ADK STAB LA-31, ADK STAB LA-32, ADK STAB LA-36, ADK STAB LA-29, ADK STAB LA-46, ADK STAB LA-F70, and ADK STAB 1413 (all of them are manufactured by ADEKA Corporation); and Tinuvin P, Tinuvin 234, Tinuvin 326, Tinuvin 328, Tinuvin 329, Tinuvin 213, Tinuvin 571, Tinuvin 765, Tinuvin 1577ED, Chimassorb 81, and Tinuvin 120 (all of them are manufactured by BASF SE) (all of which are a tradename). Above all, Tinuvin Series, manufactured by BASF SE are preferred, and Tinuvin 765 is more preferred.

These photo-stabilizers can be used either alone or in combination of two or more thereof. From the viewpoint that the effects of the present invention are not impaired, the content of the photo-stabilizer in the composition of the present invention is preferably 0.005 to 5 parts by mass, and more preferably 0.02 to 2 parts by mass based on 100 parts by mass of the sum total of the components (A) to (G).

(Mold Releasing Agent)

For an internal mold releasing agent, it is required to have the following properties, i.e., it is dissolved and well-dispersed in a (meth)acrylate compound. Furthermore, its molecular movement can easily occur during curing the composition because it is in a molten state with a low viscosity. When the composition is cured, it separates from the resin components to be cured, and is present between a mold and the cured components, whereby it has mold releasing properties. In addition, when released, it has a low viscosity in a molten state to have higher mold releasing properties. Though the internal mold releasing agent is not particularly limited, an aliphatic compound is desirable.

The aliphatic compound to be used as the internal mold releasing agent has a melting point of preferably −40° C. to 180° C., and more preferably −30° C. to 180° C. In the case where the melting point of the aliphatic compound is −40° C. or higher, there is no fear that the compound is gasified during curing, and bubbles are generated in a product to make an appearance poor, and it reveals good mold releasing properties. In addition, in the case where the melting point of the aliphatic compound is 180° C. or lower, solubility is improved to obtain good appearance and mold-releasing properties.

The aliphatic compound is preferably a compound represented by the following formula (V).

$$R^4-\underset{\underset{O}{\|}}{C}-O-W \qquad (V)$$

In the formula (V), $R^4$ represents an aliphatic hydrocarbon group having 6 to 30 carbon atoms; W represents a hydrogen atom, a metal atom, or an aliphatic hydrocarbon group having 1 to 8 carbon atoms; and when W is a metal atom, then 0 and W are ionically bonded to each other.

The aliphatic hydrocarbon group represented by $R^4$ in the formula (V) may be either linear or branched, and the bonding state within the molecular chain may be only a single bond or may contain a multiple bond. Specifically, the aliphatic hydrocarbon group is an aliphatic saturated hydrocarbon group or an aliphatic unsaturated hydrocarbon group. The number of multiple bond in the aliphatic unsaturated hydrocarbon group may be one or more than one.

The carbon number of the hydrocarbon group represented by $R^4$ is 6 to 30. When the carbon number is less than 6, the compound is evaporated or the like at the time of curing, and as a result, no aliphatic compound can be present between the mold and the material. Therefore, mold releasing properties are not revealed, or air bubbles possibly remain in the material. When the carbon number is more than 30, mobility of the material is lowered, and the aliphatic compound is incorporated into the material to cause the material to be opaque or to inhibit the mold releasing properties from being revealed. The carbon number of the hydrocarbon group represented by $R^4$ is preferably 6 to 26, and more preferably 8 to 22.

Examples of the metal atom in W represented by the formula (V) include an alkali metal, such as lithium and sodium, an alkaline earth metal, such as magnesium and calcium, zinc, and aluminum.

When W is an alkaline earth metal or aluminum, the valence of W becomes divalent or higher. Therefore, the formula (V) of the aliphatic compound is represented by $(R^4-CO-O)_q-W$, and q is 2 to 4.

The aliphatic hydrocarbon group represented by W in the formula (V) may be either linear or branched, and the bonding state within the molecular chain may be only a single bond or may contain a multiple bond. Specifically, the aliphatic hydrocarbon group is an aliphatic saturated hydrocarbon group or an aliphatic unsaturated hydrocarbon group.

The number of multiple bond in the aliphatic unsaturated hydrocarbon group may be one or more than one. The carbon number of the aliphatic hydrocarbon group represented by W is 1 to 8. When the carbon number is 8 or more, an increase in the melting point or a lowering in the solubility of the aliphatic compound are caused. As a result, there is a concern that the aliphatic compound is incorporated into the resin component or localized in the resin component at the time of curing, whereby the mold releasing properties are not revealed, or a molded body becomes opaque. The carbon number of the aliphatic hydrocarbon group represented by W is preferably 1 to 6.

In order to reveal good mold releasing properties, when W in the aliphatic compound represented by the formula (V) is a hydrogen atom, $R^4$ is preferably an aliphatic hydrocarbon group having 6 to 20 carbon atoms. In addition, when W is a metal atom, $R^4$ is preferably an aliphatic hydrocarbon group having 6 to 18 carbon atoms. When W is an aliphatic hydrocarbon group, the total carbon number of $R^4$ and W is preferably 7 to 30.

The content of the mold releasing agent in the present invention is 0.01 to 10 parts by mass, and preferably 0.01 to 5 parts by mass based on 100 parts by mass of the sum total of the components (A) to (G). When the content of the mold releasing agent is more than 10 parts by mass, there is a concern that transferability of the mold shape or shape stability to heat is not kept. On the other hand, when the content of the mold releasing agent is less than 0.01 parts by mass, there is a concern that mold releasing properties are not obtained.

The composition of the present invention can be prepared by mixing the aforementioned components (A) to (G) in a predetermined mixing ratio. The mixing method is not particularly restricted, and a known arbitrary means, such as an agitator (mixer), can be used. In addition, the components can be mixed at normal temperature, while cooling, or with heating under atmospheric pressure, reduced pressure, or pressurized pressure.

The composition of the invention is, for example, a suitable material as a housing material for optical semiconductor and is able to reduce curvature or unfilling of a lead frame molded body that may be generated at the time of producing a light-emitting device. In addition, the mass productivity and lifetime of light reflectance (shielding) of the light-emitting device can be improved, and the amount of a burr formed after molding can be suppressed, whereby removal of a burr can be omitted. According to this, the quality of the molded body after a treatment for resistance to electrolysis can be improved.

The composition of the present invention is a material capable of prolonging the time for which it can be used under the temperature of molding.

A cured product can be produced by using the composition of the present invention by conducting transfer molding, compression molding, or injection molding.

In the case of transfer molding, by using a transfer molding machine, molding can be, for example, conducted with a clamping force of 5 to 20 kN at a molding temperature of 100 to 190° C. for a molding time of 30 to 500 seconds, and preferably at a molding temperature of 100 to 180° C. for a molding time of 30 to 180 seconds. In the case of compression molding, by using a compression molding machine, molding can be conducted at a molding temperature of 100 to 190° C. for a molding time of 30 to 600 seconds, and preferably at a molding temperature of 110 to 170° C. for a molding time of 30 to 300 seconds. For any of the molding methods, post-curing may be conducted, for example, at 150 to 185° C. for 0.5 to 24 hours.

By using liquid injection molding, it can be, for example, molded with a clamping force of 10 kN to 40 kN at a molding temperature of 100 to 190° C. for a molding time of 30 to 500 seconds, and preferably at a molding temperature of 100 to 180° C. for a molding time of 20 to 180 seconds.

On the occasion of molding the composition of the present invention by transfer molding, compression molding, liquid resin injection molding, insert molding, or the like, preliminary polymerization may be conducted.

[Method for Molding a Thermosetting Material]

A method for molding a thermosetting material of the present invention includes the following steps 1 to 4:

Step 1: a step of supplying the thermosetting material of the present invention into a plunger;

Step 2: a step of filling the thermosetting material supplied in the plunger in a cavity within a mold by the plunger;

Step 3: a step of thermally curing the thermosetting material in the cavity; and Step 4: a step of taking out the thermally cured thermosetting material.

The thermosetting material of the present invention has a low-viscosity material. Therefore, by filling the thermosetting material in the mold while applying a pressure, it is possible to fill it even when a gap of 1 µm is present. On the other hand, since the thermosetting composition of the present invention contains spherical silica and a black pigment, in a step of filling the thermosetting material in a cavity within the mold, there is a concern that a "liquid releasing" phenomenon in which only the resin component of the thermosetting material is filled occurs. In addition, since the composition of the present invention is thermosetting, not only it should not be heated until immediately before molding, but also it is required to be sufficiently heated at the time of molding. Besides, there is a concern that when oxygen is present at the time of thermal curing, curing is not conducted completely.

In the molding method of the present invention, by using a plunger-type injection molding machine provided with a plunger instead of a screw-type injection molding machine, a phenomenon of leakage (back flow) or liquid releasing can be prevented from generation even in the case of a low-viscosity composition. In addition, since the composition is thermally cured in the cavity, it is possible to undergo thermal curing in the absence of oxygen. Accordingly, the molding method of the present invention is preferred as the method for molding a thermosetting material of the present invention.

Figure 2:
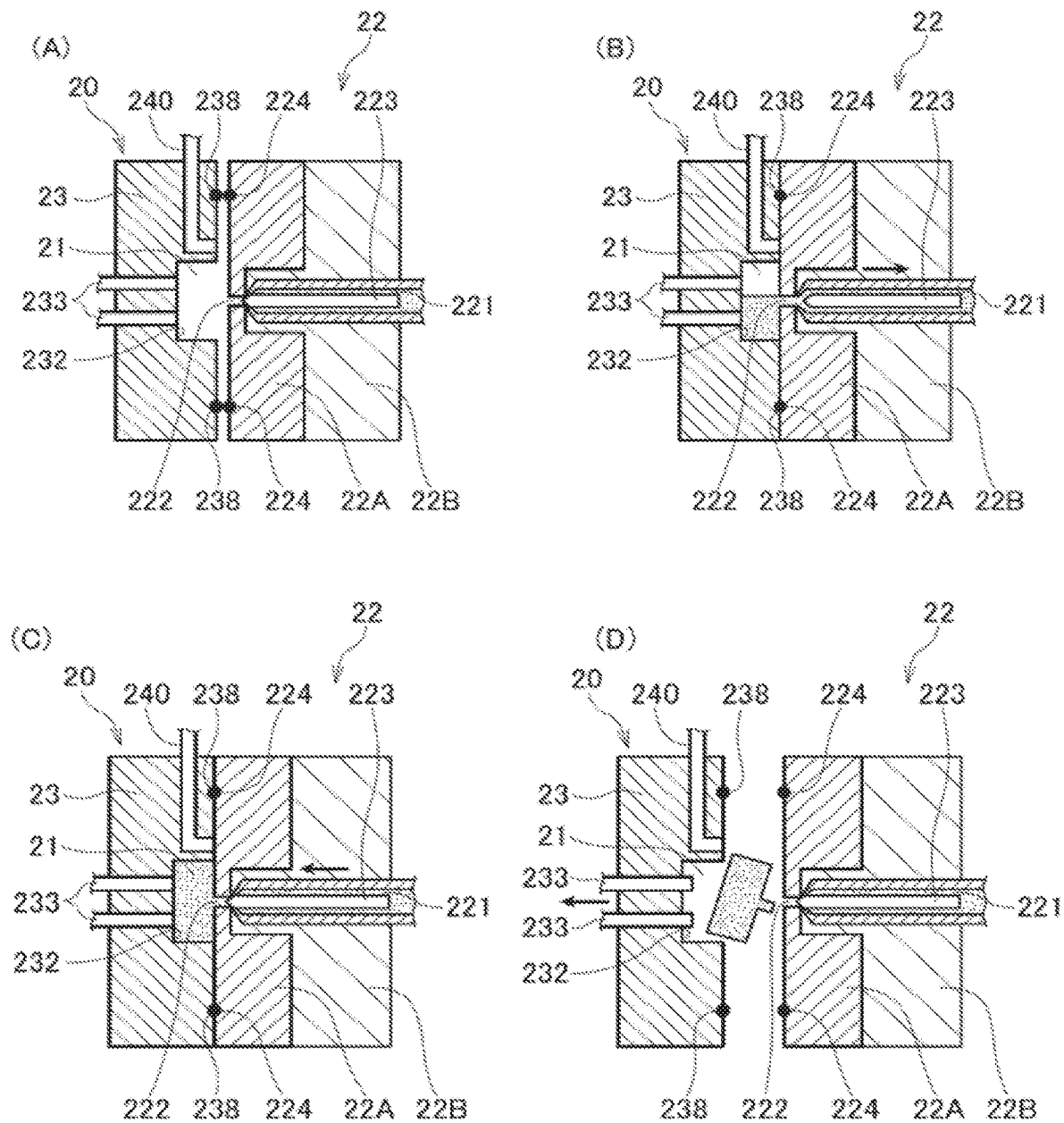
FIG. 2 illustrates diagrammatic cross-sectional views ((A) to (D)) of a mold of a molding machine which can be used for an injection molding method of a thermosetting material of the present invention.

FIGS. 1 and 2 are each a view showing one embodiment of a molding machine with which the injection molding method of the present invention can be carried out.

The molding machine which can be used in the present invention is an injection molding machine having a plunger mechanism that extrudes the thermosetting material of the present invention to a mold and is provided with a filling apparatus 10 having a plunger 11 shown in FIG. 1 and a mold 20 having a cavity 21 shown in FIG. 2 ((A) to (D)). Though illustration is omitted, the molding machine is provided with a decompressor as a degassing means connected to pores 231 (not shown) for degassing the cavity 21 in the mold 20, a heating apparatus as a heating means connected to the mold 20, and a cooling apparatus. A molding material is the thermosetting material of the present invention.

As the filling apparatus 10, a known filling apparatus provided with a plunger can be used. Typically, the filling apparatus 10 provided with the plunger 11 is, as shown in FIG. 1, provided with a feed section and a non-returning function. By allowing a screw 12 to rotate, materials that have been charged from a non-illustrated input are supplied, stirred, and mixed. However, in this embodiment, since the thermosetting material that is a homogenous liquid is charged, stirring and mixing are not necessary. Therefore, a screw configuration is not necessary, and only the raw material supplying from the inlet and provision of the non-returning function may be enough.

In the method for molding a thermosetting material of the present invention, in the step of filling in the cavity within the mold by the plunger a thermosetting material that has been supplied to the plunger, the thermosetting material is filled in the cavity within the mold through a flow channel of which the temperature has been controlled to 50° C. or lower. In the case where the molding method of the present invention is carried out by using the apparatus shown in FIG. 2, the aforementioned flow channel is corresponding to a flow channel of the thermosetting material in the filling apparatus 10 and an introduction channel 221 in the mold 20. The flow channel may be controlled to have a temperature of 50° C. or lower by using a cooling section 22B.

In the method for molding a thermosetting material of the present invention, it is preferred that the filling apparatus which is used in the filling step (step 2) is provided with a gate system which shuts off flowing of a curable liquid and delivery and receipt of heat, in the flow channel between the plunger and the cavity. In the case of carrying out the molding method of the present invention by using the apparatus shown in FIG. 2, a needle 223 and an opening 222 are corresponding to the aforementioned gate system. As mentioned above, the needle 223 moves to the side of a movable mold 23 and closes the opening 222, whereby an introduction channel 221 is separated in front of a heating section 22A. The composition that has been introduced into the introduction channel 221 is accumulated in a cooling section 22B, whereby flowing of the composition and delivery and receipt of heat can be shut off. As the system for shutting off the flowing of the composition and delivery and receipt of heat, a valve gate system, a shut-off nozzle system, or the like can be adopted.

The heating apparatus is an apparatus that heats the heating section 22A and the movable mold 23. By heating the heating section and the movable mold, it is possible to allow the temperature in the cavity 21 (also referred to as "cavity temperature") to be a predetermined temperature. In the molding method of the present invention, the mold temperature of the cavity section 232 is allowed to be preferably 100° C. or higher and 180° C. or lower, and more preferably 110° C. or higher and 160° C. or lower.

The cooling apparatus is an apparatus that cools the flow channel of the thermosetting material. Specifically, the filling apparatus 10 and the cooling section 22B of the mold 20 may be cooled to 10° C. or higher and 50° C. or lower.

The molding method of the thermosetting resin by using the aforementioned molding machine includes a mold clamping step; a step of supplying a predetermined amount of a thermosetting material into a plunger (thermoplastic material supply step; step 1), a step of filling by means of the plunger the thermosetting material supplied in the plunger in a cavity within a mold (filling step; step 2); a step of thermally curing the thermosetting material in the cavity (curing step; step 3); and a step of taking out the thermally cured thermosetting material (mold releasing step; step 4).

Thermoplastic Material Supply Step (Step 1)

When molding is conducted by transfer molding, weighing can be conducted by inserting into a plunger section in the mold an appropriate amount of a material by using a supply apparatus, such as a syringe.

When molding is conducted by injection molding, the thermosetting material is injected from an inlet (not shown) to the filling apparatus 10 shown in FIG. 1. The supplied thermosetting material is extruded to a flow section (such as screw) 12, and then, a predetermined amount is weighed by the plunger 11. After completion of the weighing or before the injection, the flow section 12 advances and exhibits a function as a non-return valve when the plunger 11 operates. During this period of time, since the flow channel is cooled by the cooling apparatus, the thermosetting material flows smoothly without being cured.

Filling Step (Step 2)

(1) Case where an in-Mold Decompression Mechanism is Provided

When injecting the material to the cavity, it is required to release the air in the cavity through a vent, or to decompress inside of the cavity 21 provided with a decompression tube 240 that is connected to a non-shown decompression apparatus and enable to decompress inside of the cavity 21. The reason is that, during the process of injecting a material to the cavity 21 and filling it in the cavity completely, the vent serves to release the air in the cavity, and decompression in the cavity enables complete filling by allowing the inside of the cavity to be free from the presence of air. If these mechanisms are not present, another mechanism that allows the air in the cavity to be released at the time of filling the material becomes necessary (for example, a vent mechanism).

In order to mold the thermosetting material, first, the movable mold 23 is allowed to approach a fixed mold 22, and clamping is conducted. At a position where an elastic member 238 of the movable mold 23 abuts an elastic member 224 of the fixed mold 22, movement of the movable mold 23 once stops.

(2) Filling of Material (Injection)

Preferably, the filling step is conducted by opening the gate of a gate system and filling the thermosetting material in the cavity within the mold. The heating section 22A provided in the movable mold 23 and the fixed mold 22 is heated all the time and set such that the cavity temperature becomes 60° C. or higher, preferably 90° C. or higher and 180° C. or lower, and especially preferably 110° C. or higher and 170° C. or lower. In the case of using an injection molding machine, when the injection is started from an injection section to the cavity, a nozzle of a shut-off nozzle (in some cases, a valve gate) is opened, and the plunger in an injection section is allowed to move, thereby injecting the thermosetting components into the cavity. In the case of using a transfer molding machine, all of the raw materials from the inside of the plunger to the cavity section 232 are cured. Therefore, so far as the flow of the material to the cavity 21 is possible, there is no need to shut off the delivery and receipt of heat.

Curing Step (Step 3)

When filling of the thermosetting material to the cavity 21 is completed, curing of the thermosetting material simultaneously starts. In order to improve transferability of a molded article, it is necessary to conduct curing by applying a predetermined pressure. That is, it is preferred that the plunger 11 is made in a pressurized state of 1.0 MPa or more and 15 MPa or less. This pressure to be applied to the thermosetting material in order to improve the transferability is called a holding pressure.

In the curing step, it is preferred that the injection pressure of the thermosetting material is increased after the start of curing, and pressure holding is carried out before completion of the curing, and after completion of the pressure holding, the gate of the gate system is closed to conduct thermal curing. Specifically, the gate is closed by advancing the needle 223 and closing the opening 222. Then, the cooling apparatus is operated, the entire area of the flow channel of the thermosetting material, i.e., the filling apparatus 10 of the molding machine and the cooling section 22B provided in the fixed mold 22 of the mold 20 are cooled. On this occasion, the cooling temperature is set to preferably 10° C. or higher and 50° C. or lower, and especially preferably 30° C. or lower.

Figure 3:
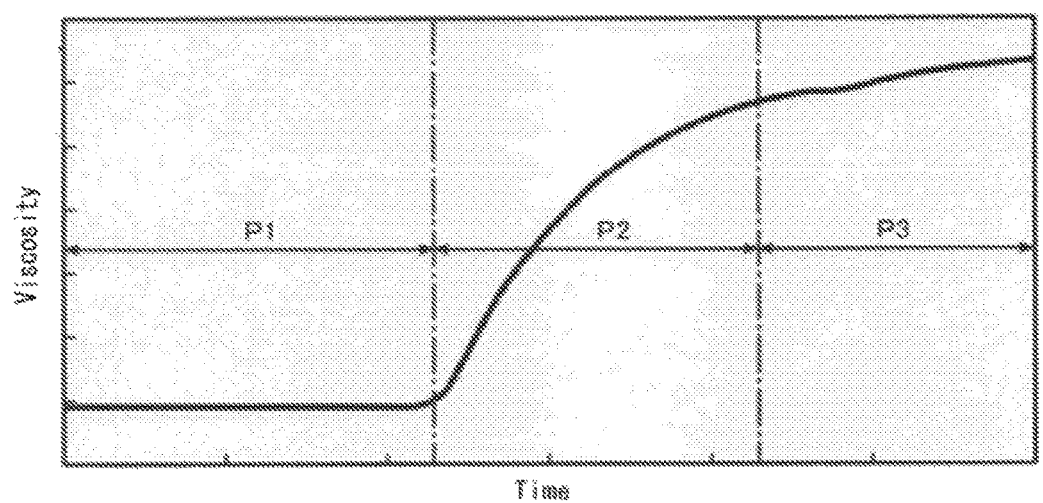
FIG. 3 is a graph showing a relation between a viscosity and a time according to one embodiment of an injection molding method of a thermosetting material of the present invention.

The pressure holding in the plunger 11 and timing when the pressure holding starts are hereunder described. FIG. 3 is a graph showing a relation between a viscosity of the thermosetting material and a time in this embodiment. In FIG. 3, a period P1 (required time $t_1$) from the injection of the material to the cavity to completion of the filling is corresponding to an introduction period during which heat is applied to the material, and the curing starts. The curing step is divided into two steps; i.e., the initial curing period P2 (required time $t_2$) during which the material starts to be cured by applying heat, and the material is cured, and the later curing period P3 (required time $t_3$) during which the curing is completed. During the introduction period P1, the viscosity of the thermosetting material does not change and is kept to be low. During the initial curing period P2, a significant viscosity change from a low viscosity to a high viscosity is observed. During the later curing period P3, the viscosity of the thermosetting material slowly increases in a high viscosity state.

In the initial curing period P2, not only a change in viscosity of the thermosetting material associated with its change from a liquid to a solid occurs, but also the volume thereof is changed, followed by shrinkage. As a result, so long as a pressure is not applied to the thermosetting material, a molded article becomes poor in transferability. In order to improve the transferability, it is required to apply a pressure to the thermosetting material (pressure holding) to allow the thermosetting material to adhere to the mold 20, as well as to compensate the thermosetting material from the gate part.

However, in a low-viscosity material as in the thermosetting material of this embodiment, when a pressure is applied in the state where the viscosity of the material is low, due to its low viscosity, unfavorable molding associated with formation of a burr (specifically, the material leaks from a gap between the fixed mold 22 and the movable mold 23 and is cured) occurs or a poor operation of a knockout pin 233 (simply shown in FIG. 2) or an extrusion plate is caused by infiltration of the thermosetting material into a gap or the like around the knockout pin 233 or the extrusion plate, or other troubles occur. On the other hand, even when a pressure is applied in the state where the viscosity is increased in the initial curing period P2 or in the later curing period P3, a thermosetting material cannot be deformed by compression due to a high viscosity of the thermosetting material, so as not to improve transferability. Therefore, in order to obtain a molded article having high transferability, the timing at which the pressure holding starts (pressure holding start time T) is required to be in conformity with the timing at which the introduction period P1 of the curing step is shifted to the initial curing period P2.

Here, when the viscosity of the thermosetting material in the cavity 21 can be detected, the pressure holding start time T can be determined. However, in order to measure the viscosity of the thermosetting material, it is necessary to incorporate an apparatus for measuring the viscosity of the thermosetting material in the cavity 21 of the mold 20. This leads to an increase in size of the mold 20, complication of the mechanism, a significant increase in production cost, and hence, such is not realistic.

The thermosetting material in this embodiment starts to shrink when the viscosity thereof is increased in the initial curing period P2. Therefore, by detecting the time when shrinkage starts, the pressure holding time T can be appropriately determined.

By conducting the pressure holding under the aforementioned conditions in the curing step, formation of sink marks or deformation of a molded article can be prevented, and the transferability can be improved.

After completion of the pressure holding for a certain period of time, as shown in FIG. 2 (C), the needle 223 is advanced to block the opening 222 and heated for a certain period of time such that a non-cured portion is not generated, thereby completely curing the thermosetting material.

The time taken for allowing the thermosetting material to be completely cured by further heating after the filling step, i.e., $(t_1+t_2+t_3)$ (the total time required for the filling step to completion of the curing step) is preferably 0.2 to 3 minutes, and more preferably 0.2 to 2 minutes. If the $(t_1+t_2+t_3)$ is less than 0.2 minute, there is a concern that un-curing occurs. The case where the $(t_1+t_2+t_3)$ is more than 3 minutes is not preferred from the viewpoint of mass productivity.

Mold Releasing Step (Step 4)

The mold releasing step is a step of allowing the molded article after completion of curing to be readily taken out. Specifically, after completion of curing, the mold 20 is opened, and the molded article is extruded in a range of 0.1 to 5 mm by the knockout pin 233 (simply shown in FIG. 2) or the extrusion plate and readily released from the mold 20.

[Cured Product]

The cured product can be obtained by curing by subjecting the thermosetting composition of the present invention explained above to polymerization with heat. Preferably, it is a cured product obtained by molding by the production method of the present invention.

The cured product of the present invention can be, for example, preferably used as a housing material or the like for use in an optical semiconductor light-emitting device. The housing material using the cured product of the present invention does not change in terms of a reflectance (shielding rate) even when used for a long period of time, has a low reflectance (high shielding rate) in the visible light and near ultraviolet light region, has excellent heat resistance and weather resistance, and is improved in adhesion to peripheral members.

The housing material using the thermosetting material of the present invention is low in a reflectance in the visible light and near ultraviolet light region and is small in a change of reflectance even when used for a long period of time. The light reflectance at a wavelength of 400 to 800 nm of the reflector using the thermosetting material of the present invention is preferably 20 to 1% or less, more preferably 10 to 1% or less, and still more preferably 7 to 1% or less in terms of an initial value. The light reflectance after the deterioration test conducted at 150° C. for 1,000 hours of preferably 20 to 10% or less, more preferably 10 to 1% or less, and still more preferably 7 to 1% or less can be achieved. The light reflectance can be determined by the method described in the section of Examples.

[Optical Semiconductor Light-Emitting Device]

The optical semiconductor light-emitting device includes the housing material as explained above. As for other configurations of the optical semiconductor light-emitting device, known configurations can be adopted.

Figure 4:
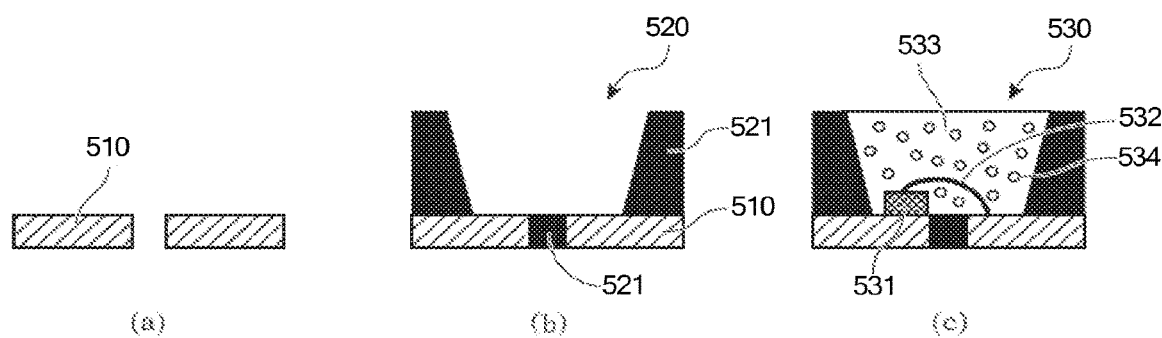
FIG. 4 is a diagrammatic cross-sectional view showing one embodiment of a substrate for optical semiconductor element mounting and an optical semiconductor light-emitting device, each using a thermosetting material of the present invention, in which (a) is a cross-sectional view of a lead frame, (b) is a cross-sectional view of a substrate for optical semiconductor element mounting, and (c) is a cross-sectional view of an optical semiconductor light-emitting device.

A substrate for optical semiconductor element mounting and an optical semiconductor light-emitting device are further described with reference to the drawings. FIG. 4 is a diagrammatic cross-sectional view showing one embodiment of the substrate for optical semiconductor element mounting and the optical semiconductor light-emitting device.

FIG. 4(a) shows a lead frame 510.

FIG. 4(b) shows a substrate 520 for optical semiconductor element mounting with a housing material 521 obtained by molding a resin molded body in the lead frame 510 shown in FIG. 4(a). The substrate 520 for optical semiconductor element mounting has a concave part constituted of a bottom surface composed of the lead frame 510 and the housing material 521 and an inner peripheral side surface composed of the housing material 521. The resin molded body constituting the housing material 521 is one obtained by curing the composition of the present invention.

FIG. 4(c) shows an optical semiconductor light-emitting device 530 in which an optical semiconductor element 531 is mounted on a lead frame of the substrate for optical semiconductor element mounting shown in FIG. 4(b), the optical semiconductor device 531 and another lead frame on which the optical semiconductor element 531 is not mounted are bonded by means of a wire 532, and the concave part is sealed with a transparent resin (sealing resin) 533. The inside of the sealing resin may contain a fluorescent material 534 for converting emitted light of a blue color or the like to a white color.

Figure 5:
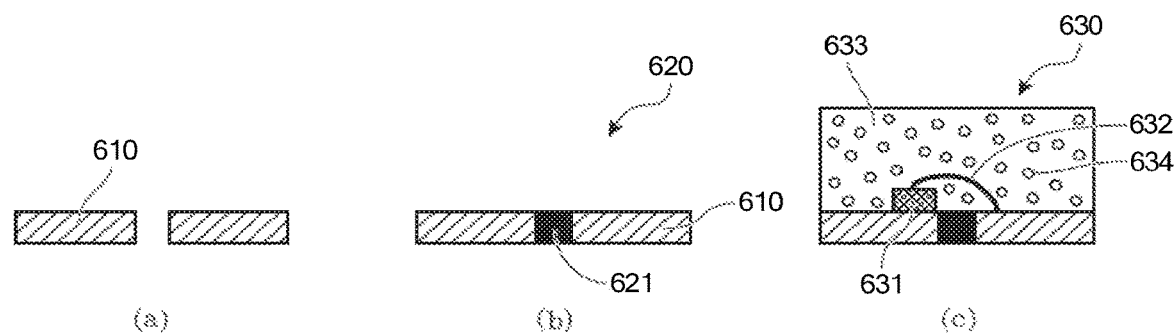
FIG. 5 is a diagrammatic cross-sectional view showing another embodiment of a substrate for optical semiconductor element mounting and an optical semiconductor light-emitting device, each using a thermosetting material of the present invention, in which (a) is a cross-sectional view of a lead frame, (b) is a cross-sectional view of a substrate for optical semiconductor element mounting, and (c) is a cross-sectional view of an optical semiconductor light-emitting device.

FIG. 5 is a diagrammatic cross-sectional view showing another embodiment of a substrate for optical semiconductor element mounting and an optical semiconductor light-emitting device.

FIG. 5(a) shows a lead frame 610.

FIG. 5(b) shows a substrate 620 for optical semiconductor element mounting in which a resin molded body is molded as a housing material 621 between the lead frames 610 shown in FIG. 5(a). The substrate 620 for optical semiconductor element mounting is provided with the housing material 621 of the present invention between the lead frame 610 and the lead frame 610.

FIG. 5(c) shows an optical semiconductor light-emitting device 630 provided with the substrate for optical semiconductor element mounting shown in FIG. 5(b). The optical semiconductor element 631 is mounted on the lead frame 610 and electrically connected by means of a bonding wire 632. Thereafter, a sealed resin section composed of a transparent sealing resin 633 is molded by curing comprehensively by a method, such as transfer molding and compression molding, thereby sealing the optical semiconductor device 631, and then, dicing is conducted to allow it to be pieces. In the inside of the sealed resin, a fluorescent material 634 for converting the emission color from blue to white may be contained.

The dimension and shape of each section of the substrate for optical semiconductor element mounting are not particularly restricted and can be appropriately set.

The sealing resin (sealing material) is composed of, for example, an epoxy resin, a silicone resin, or an acrylate resin.

EXAMPLES

The present invention is hereunder described in more detail by reference to Examples, but it should be construed that the present invention is not limited by the Examples.

Examples 1 to 17 and Comparative Examples 1 to 4

Thermosetting compositions were each prepared by using raw materials and with a composition ratio shown in Tables 1 to 3. Molded articles were obtained under the following molding condition A or B.

Preparation Method of Curable Liquid

Liquid components and additive components were respectively weighed and stirred. Inorganic components were then weighed and stirred. The inorganic components were blended in the order of the component (G), the component (C), and the component (B). As a stirring apparatus, one capable of conducting stirring by rotation and revolution was used. The rotation was conducted at a speed of 1,000 rpm, and the revolution was conducted at a speed of 2,000 rpm, and the stirring was conducted for 1 minute. As such an apparatus, "Awatori Rentaro", manufactured by Thinky Corporation was used.

[Liquid Transfer Molding (LTM) (Molding Condition A)]
Molding machine: Liquid transfer molding machine "G-Line", manufactured by Apic Yamada Corporation
Flow channel temperature of low-temperature section: 25° C.
Flow channel and shut-off method: Manual shut-off by using a syringe
Flow channel temperature of high-temperature section and cavity temperature: The temperature was set at 150° C. when "Perbutyl E" was used as the additive, and the temperature was set at 130° C. when "Perhexa HC" was used as the additive.
Filling time: 10 seconds
Filling pressure: 2 MPa (priority was on the filling time)
Pressure holding time: 15 seconds
Pressure at the time of pressure holding: 5 MPa
Curing time: 90 seconds By adopting the aforementioned molding machine and condition, the gate of the gate system was opened; the thermosetting material was filled in the cavity within the mold; after start of thermal curing, the injection pressure of the thermosetting material was increased, to carry out the pressure holding before completion of curing; and after completion of pressure holding, the gate of the gate system was closed, to conduct thermal curing.

[Liquid Injection Molding (LIM) (Molding Condition B)]
Molding machine: Liquid thermosetting resin injection molding machine "LA-40S", manufactured by Sodick Co., Ltd.
Flow channel temperature of low-temperature section: 20° C.
Flow channel and heat shut-off method: Shut-off nozzle was used.
Temperature of flow channel of a high-temperature part and the cavity temperature: The temperature was set at 150° C. when "Perbutyl E" was used as the additive, and the temperature was set at 130° C. when "Perhexa HC" was used as the additive.
Filling time: 10 seconds
Pressure at the time of filling: 2 MPa (priority was put on the filling time)
Pressure holding time: 15 seconds
Pressure at the time of pressure holding: 5 MPa
Curing time: 90 seconds The respective components used for preparing the thermosetting composition are as follows

[Component (A): (Meth)Acrylate Compound]
AM: Adamantyl methacrylate (M-104, manufactured by Idemitsu Kosan Co., Ltd., viscosity at 25° C. measured with a rotational viscometer at a constant shear rate (JIS K7117-2:1999): 10 mPa·s)
IBMA: 1-Isobornyl methacrylate (IB-X, manufacture by Kyoeisha Chemical Co., Ltd., viscosity at 25° C. measured with a rotational viscometer at a constant shear rate (JIS K7117-2:1999): 10 mPa·s)

[Components (D), (E) and (F): (Meth)Acrylate Compound]
  LA: Lauryl acrylate (SR335, manufactured by Arkema Co., Ltd.)
  StMA: Stearyl methacrylate (manufactured by Kyoeisha Chemical Co., Ltd.)
  SR351: Trimethylolpropane triacrylate (manufactured by Arkema Co., Ltd.)
    GMA: Glycidyl methacrylate (Blemmer GH, manufactured by NOF Corp oration)
    DCP: Tricyclodecane dimethanol dimethacrylate (manufactured by Shin-Nakamura Chemical Co., Ltd.)
    A-DOD-N: 1,10-Decanediol diacrylate (manufactured by Shin-Nakamura Chemical Co., Ltd.)
    3000 MK: Bisphenol A diglycidyl ether methacrylic acid adduct (3000 MK, manufactured by Kyoeisha Chemical Co., Ltd.)
  MMA: Methyl methacrylate (manufactured by Hiroshima Wako Co., Ltd.)
[Component (B): Spherical Silica]
  CRS1085-SF630: Spherical silica having an average particle diameter (D50) of 15 μm (manufactured by Tatsumori Ltd.)
  CRS1035-LER4: Spherical silica having an average particle diameter (D50) of 2 μm (manufactured by Tatsumori Ltd.)
  S430-5PHM: Spherical silica having an average particle diameter (D50) of 5 μm (manufactured by Nippon Steel Sumikin Material Co., Ltd, Micron Company)
[Component (C): Black Pigment]
  MA100: Carbon black having an average particle diameter of 0.025 μm, manufactured by Mitsubishi Chemical Corporation
  MA100R: Carbon black having an average particle diameter of 0.025 μm, manufactured by Mitsubishi Chemical Corporation
    16M: Titanium black having an average particle diameter of 0.1 μm, manufactured by Mitsubishi Materials Corporation
    13M-C: Titanium black having an average particle diameter of 0.075 μm, manufactured by Mitsubishi Materials Corporation
  TM-B: Titanium suboxide having an average particle diameter of 0.7 μm, manufactured by Ako Kasei Co., Ltd.
[Component (G): Nano Particle]
  R711: Fumed silica having an average particle diameter of 0.005 to 0.05 nm (manufactured by Nippon Aerosil Co., Ltd.)
[Additive]
  Tinuvin765: UV absorber (manufactured by BASF Japan Co., Ltd.)
  StMg: Magnesium stearate (manufactured by NOF Corporation)
  StZn: Zinc stearate (manufactured by Dainichi Chemical Industry Co., Ltd.)
  Perbutyl E: Organic peroxide (manufactured by NOF Corporation)
  Perhexa HC: Organic peroxide (manufactured by NOF Corporation)
  Trigonox 122-C80: Organic peroxide (manufactured by Kayaku Akzo Co., Ltd.)

For the compositions prepared and the molded articles obtained, the following evaluations were conducted. The results are shown in Tables 1 to 3.

(1) Viscosity Measurement Method

For the prepared composition, the melt viscosity was measured by means of a viscoelastic measurement apparatus under the following conditions:
  Name of apparatus: Physica MCR301, manufactured by Anton Paar GmbH
  Measurement method: Coaxial cylinder rotational viscosity measurement
  Temperature: 25° C.
  Shear rate range: 1 to 200 (1/s)

In this shear rate region, the shear viscosity at 10 (1/s) and 100 (1/s) were taken as the viscosity.

At the time of measurement, when measurement could not be conducted due to occurrence of slippage, a normal force was applied in a range where the thickness was not changed.

(2) Evaluation on Mold and Moldability

As for the mold for evaluating moldability, a mold having a size of 10 mm (width)×50 mm (length)×1 mm (thickness) and having a vent having a size of 5 mm (width)×10 mm (length)×0.03 mm (thickness) at the flow end part was used. In addition, as for the mold for evaluating properties, a mold having a size of 50 mm (width)×50 mm (length)×2 mm (thickness) was used.

(2-1) Evaluation of Moldability

As for evaluation of moldability, the presence or absence of generation of an unfilled section was confirmed. The temperature of the mold was set to a predetermined temperature, and in a process of filling for 10 to 15 seconds, generation of a void and an unfilling section in a molded article were confirmed visually. When both of a void and unfilling section were generated, the moldability was evaluated as "C"; when either one of them was generated, the moldability was evaluated as "B"; and when neither of them were generated, the moldability was evaluated as "A".

(2-2) Formation of Burr

The temperature of the mold was set to a predetermined temperature, and in a process of filling for 10 seconds to 15 seconds, formation of a burr was visually confirmed. When the burr was formed such that it exceeded the end part of the vent, or the burr was formed from a portion other than the vent section, formation of a burr was evaluated as "C"; when either one of them was generated, formation of a burr was evaluated as "B"; and when neither of them were generated, the formation of a burr was evaluated as "A".

(3) Measurement of Light Reflectance

For the resulting molded article, using a recording spectrophotometer (a product name: UV-2400PC, manufactured by Shimadzu Corporation) to which a multi-purpose large-sized sample chamber unit (a product name: MPC-2200, manufactured by Shimadzu Corporation) was attached, the light reflectances of a cured test piece at 450 nm and 650 nm were measured.

(4) Measurement of Lightness L*

Using an integrating sphere spectrophotometer (CE-7000A, manufactured by GretagMacbeth GmbH), a cured test piece (30 mm (length)×30 mm (width)×2 mm (thickness)) was measured for a reflectance in a range of wavelength of 400 to 700 nm under conditions: reflectance measurement mode, a ten-degree visual field, diffusive illumination/eight-degree direction light receipt, colorimetry area of 5 mm×10 mm, including specular reflection and ultraviolet light, to obtain a light reflectance of the cured test piece at 450 nm.

(5) Measurement of Light Resistance

The cured test piece was fixed on an LED package mounted with a blue LED (a trade name: OBL-CH2424, manufactured by GeneLite Inc.). The LED was allowed to emit light by applying an electric current of 150 mA for one week at an environmental temperature of 60° C. Surface of the cured test piece exposed to the LED light was visually observed and evaluated according to the following criteria.

A: A new unevenness on the surface was not observed.
C: A new unevenness on the surface was observed.

(6) Evaluation of Heat Resistance

The resulting molded article was allowed to stand in an oven (an instrument name: Safety Oven SPH-102, manufactured by ESPEC Corp.) at 180° C. for 200 hours, and the molded article after allowing to stand was evaluated for a weight loss (%) and an appearance (cracking). The case where the weight loss was 2% or less from the initial value, and neither cracking nor chipping was generated was evaluated as "A"; the case where the weight loss was more than 2% from the initial value, or cracking or chipping was generated was evaluated as "B"; and the case where the weight loss was more than 2% from the initial value, and cracking or chipping was generated was judged as "C".

(7) Evaluation of Molding Method

As for the evaluation method for the molding machine and the mold, the continuous moldabilities 1 and 2 were evaluated. As for the continuous moldability 1, on the occasion of continuously conducting molding 300 times, in cold flow channels (places controlled to 50° C. or lower) of the molding machine and the mold, the presence or absence (weighing accuracy) of defective molding to be caused due to clogging of the material was evaluated. The case where after continuously conducting molding 300 times, the flow channels were clogged, or a difference in weighing from that at the 10th time was 15% or more, was evaluated as "C"; and the case where the flow channels were not clogged, or the difference in weighing was within 15%, was evaluated as "A".

As for the continuous moldability 2, on the occasion of continuously conducting molding 300 times, allowing to stand for 24 hours or more, and again continuously conducting molding 100 times, the presence or absence (weighing accuracy) of defective molding to be caused due to clogging of the material was evaluated. The case where after allowing to stand for 24 hours and then continuously conducting molding 100 times, the flow channels were clogged, or a difference in weighing from that at the 10th time before allowing to stand for 24 hours or more was 15% or more, was evaluated as "C"; and the case where the flow channels were not clogged, or the difference in weighing was within 15%, was evaluated as "A".

(8) Storability Test 500 g of the prepared curing liquid was weighed in a 300-mL polypropylene-made disposable cup (V-300, φ91×φ67×96 mm) or a 500-mL polypropylene-made disposable cup (V-500, φ103×φ78×119 mm); the weighed container was put into a sealed container such that the curing liquid was not volatilized; and after allowing to stand for 72 hours, the amount of liquid which had caused solid-liquid separation and floated (amount of supernatant, hereinafter referred to as "floated liquid amount") was weighed. The floated liquid amount was desirably low. The case where the floated liquid amount was 1 mL or less was evaluated as "A", and the case where the floated liquid amount was more than 1 mL was evaluated as "C".

TABLE 1

| | | | | Example 1 | Example 2 | Example 3 | Example 4 | Example 5 | Example 6 | Example 7 |
|---|---|---|---|---|---|---|---|---|---|---|
| Raw material | Component | (A) | AM | 5 | 5 | 5 | 5 | | | 3 |
| | | | IBMA | | | | | 5 | 5 | |
| | | (E) | LA | 2.5 | 5 | 2.5 | | | 4 | |
| | | | StMA | | | | 2.5 | 2.5 | | 1.5 |
| | | (F) | SR351 | | | | | 5 | | |
| | | (D) | GMA | 2.5 | | 2.5 | 2.5 | 2.5 | | 1.5 |
| | | (F) | DCP | 10 | 10 | 10 | | | | |
| | | | A-DOD-N | | | | 10 | 5 | 8 | 6 |
| | | | 3000MK | | | | | | 3 | |
| | | (E) | MMA | | | | | | | |
| | (B) Silica | | CRS1085-SF630 | 79 | 79 | 40 | 79 | | 40 | 87 |
| | | | CRS1035-LER4 | | | 39 | | | 39 | |
| | | | S430-5PHM | | | | | 79 | | |
| | (C) Black pigment | | 16M | 1 | | | 1 | | | 1 |
| | | | 13M-C | | 1 | | | | | |
| | | | TM-B | | | 1 | | | 1 | |
| | | | MA100 | | | | | 1 | | |
| | | | MA100R | | | | | | | |
| | Total mass | | mass % | 100 | 100 | 100 | 100 | 100 | 100 | 100 |
| | (G) Nano particle | R711 | mass parts | 0.2 | | | | | | |
| | Additive | | mass parts | 1.2 | 1.5 | 1 | 1 | 1 | 1.2 | 0.8 |
| Production method | | Molding method | | B *2 | A *1 | B | B | B | B | B |
| Evaluation results | State of molding machine and mold | Continuous moldability 1 | | A | A | A | A | A | A | A |
| | | Continuous moldability 2 | | A | A | A | A | A | A | A |
| | State of molded article | Generation of unfilled section | | A | A | A | A | A | A | A |
| | | Formation of burr | | A | A | A | A | A | A | A |
| | Evaluation of properties | Shear viscosity *3 [Pa·s] | 10 (1/s) | 16 | 16 | 21 | 17 | 25 | 21 | 34 |
| | | | 100 (1/s) | 4 | 4 | 5 | 4 | 6 | 5 | 7 |
| | | Light | 450 nm | 5 | 5 | 5 | 5 | 5 | 5 | 5 |

TABLE 1-continued

|  |  | Example 1 | Example 2 | Example 3 | Example 4 | Example 5 | Example 6 | Example 7 |
|---|---|---|---|---|---|---|---|---|
| reflectance (%) | 650 nm | 5 | 5 | 5 | 5 | 5 | 5 | 5 |
| Lightness | L* | 8 | 8 | 8 | 8 | 8 | 8 | 8 |
| Light resistance |  | A | A | A | A | A | A | A |
| Heat resistance |  | A | A | A | A | A | A | A |
| Storability |  | A | A | A | A | A | A | A |

Molding method:
*1 = A: LTM molding,
*2 = B: LIM molding,
*3 = Viscosity of thermosetting resin composition at 25° C.

TABLE 2

|  |  |  |  | Example 8 | Example 9 | Example 10 | Example 11 | Example 12 | Example 13 | Example 14 |
|---|---|---|---|---|---|---|---|---|---|---|
| Raw material | Component | (A) | AM | 2.5 | 2.5 | 5 | 3 | 2 | 4 | 3 |
|  |  |  | IBMA |  |  |  |  |  |  |  |
|  |  | (E) | LA |  |  | 3 |  |  |  |  |
|  |  |  | StMA | 2.5 | 2 |  | 2.5 | 2.5 | 1.5 | 2 |
|  |  | (F) | SR351 |  |  |  |  |  |  |  |
|  |  | (D) | GMA | 2.5 | 2 |  | 2.5 | 2.5 | 1.5 | 1 |
|  |  | (F) | DCP |  |  |  |  |  |  |  |
|  |  |  | A-DOD-N 3000MK | 7.5 | 6.5 | 9 | 9 | 10 | 6 | 7 |
|  |  | (E) | MMA |  |  |  |  |  |  |  |
|  | (B) Silica |  | CRS1085-SF630 | 42 |  | 82 |  |  | 86.4 |  |
|  |  |  | CRS1035-LER4 | 42 |  |  | 82 |  |  | 86.4 |
|  |  |  | S430-5PHM |  | 86 |  |  | 82 |  |  |
|  | (C) Black pigment |  | 16M |  |  | 1 |  |  |  |  |
|  |  |  | 13M-C | 1 |  |  | 1 |  |  |  |
|  |  |  | TM-B |  | 1 |  |  | 1 |  |  |
|  |  |  | MA100 |  |  |  |  |  | 0.6 |  |
|  |  |  | MA100R |  |  |  |  |  |  | 0.6 |
|  | Total mass |  | mass % | 100 | 100 | 100 | 100 | 100 | 100 | 100 |
|  | (G) Nano particle | R711 | mass parts |  | 0.1 |  |  | 0.2 |  |  |
|  | Additive |  | mass parts | 0.8 | 0.7 | 1 | 1 | 1 | 0.5 | 0.7 |
| Production method |  | Molding method |  | A | B | B | A *1 | B *2 | A | B |
| Evaluation results | State of molding machine and mold | Continuous moldability 1 |  | A | A | A | A | A | A | A |
|  |  | Continuous moldability 2 |  | A | A | A | A | A | A | A |
|  | State of molded article | Generation of unfilled section |  | A | A | A | A | A | A | A |
|  |  | Formation of burr |  | A | A | A | A | A | A | A |
|  | Evaluation of properties | Shear viscosity *3 [Pa·s] | 10 (1/s) | 38 | 55 | 45 | 35 | 42 | 45 | 52 |
|  |  |  | 100 (1/s) | 14 | 13 | 6 | 8 | 10 | 11 | 12 |
|  |  | Light reflectance (%) | 450 nm | 5 | 5 | 5 | 5 | 5 | 5 | 5 |
|  |  |  | 650 nm | 5 | 5 | 5 | 5 | 5 | 5 | 5 |
|  |  | Lightness | L* | 8 | 8 | 8 | 8 | 8 | 5 | 5 |
|  |  | Light resistance |  | A | A | A | A | A | A | A |
|  |  | Heat resistance |  | A | A | A | A | A | A | A |
|  |  | Storability |  | A | A | A | A | A | A | A |

Molding method:
*1 = A: LTM molding,
*2 = B: LIM molding,
*3 = Viscosity of thermosetting resin composition at 25° C.

TABLE 3

|  |  |  |  | Example 15 | Example 16 | Example 17 | Comparative Example 1 | Comparative Example 2 | Comparative Example 3 | Comparative Example 4 |
|---|---|---|---|---|---|---|---|---|---|---|
| Raw material | Component | (A) | AM | 3 | 3 | 3.5 | 1 | 8 |  |  |
|  |  |  | IBMA |  |  |  |  |  |  |  |
|  |  | (E) | LA |  |  | 1.5 | 3 | 16 |  |  |
|  |  |  | StMA | 2 | 2 |  |  |  |  |  |
|  |  | (F) | SR351 |  |  |  |  |  |  |  |
|  |  | (D) | GMA | 1 | 1 | 2 | 1 | 5 |  |  |

TABLE 3-continued

| | | | Example 15 | Example 16 | Example 17 | Comparative Example 1 | Comparative Example 2 | Comparative Example 3 | Comparative Example 4 |
|---|---|---|---|---|---|---|---|---|---|
| | (F) | DCP | | | | 5 | 20 | | |
| | | A-DOD-N 3000MK | 7 | 7 | 7 | | | | |
| | (E) | MMA | 10 | | | | | 20 | 20 |
| (B) Spherical Silica | CRS1085-SF630 | | 86 | | | | 89 | 79 | 79 |
| | CRS1035-LER4 | | | 86 | | | | | |
| | S430-5PHM | | | | 85 | 50 | | | |
| (C) Black pigment | 16M | | | | | | 1 | 1 | 1 |
| | 13M-C | | 0.7 | | | | | | |
| | TM-B | | | 0.7 | 0.7 | | | | |
| | MA100 | | 0.3 | | | 1 | | | |
| | MA100R | | | 0.3 | 0.3 | | | | |
| | Total mass | mass % | 110 | 100 | 100 | 100 | 100 | 100 | 100 |
| (G) Nano particle | R711 | mass parts | | | | 0.2 | 0.2 | 0.2 | 0.2 |
| | Additive | mass parts | 0.9 | 0.7 | 0.7 | 0.8 | 1.3 | 1 | 1 |
| Production method | Molding method | | B *2 | B | B | B | B | A *1 | B |
| Evaluation results | State of molding machine and mold | Continuous moldability 1 | A | A | A | C | A | A | A |
| | | Continuous moldability 2 | A | A | A | C | C | A | A |
| | State of molded article | Generation of unfilled section | A | A | A | C | C | A | A |
| | | Formation of burr | A | A | A | A | C | A | A |
| | Evaluation of properties | Shear viscosity *3 [Pa·s] 10 (1/s) | 42 | 38 | 38 | 150 | 0.5 | 17 | 17 |
| | | 100 (1/s) | 12 | 10 | 10 | 60 | 0.1 | 4 | 4 |
| | | Light reflectance (%) 450 nm | 5 | 5 | 5 | 5 | 5 | 5 | 5 |
| | | 650 nm | 5 | 5 | 5 | 5 | 5 | 5 | 5 |
| | | Lightness L* | 6 | 6 | 6 | 8 | 5 | 8 | 8 |
| | | Light resistance | A | A | A | A | A | A | A |
| | | Heat resistance | A | A | A | A | B | C | C |
| | | Storability | A | A | A | A | C | A | A |

Molding method:
*1 = A: LTM molding,
*2 = B: LIM molding,
*3 = Viscosity of thermosetting resin composition at 25° C.

INDUSTRIAL APPLICABILITY

The thermosetting material of the present invention can be suitably utilized as a raw material of a housing section for optical semiconductor light-emitting device because on the occasion of molding a housing section in a lead frame, the material is able to prevent generation of an unfilled section and a void in the obtained molded article and suppress generation a burr and has excellent continuous moldability.

In addition, the present invention can be utilized as a molding method of a thermosetting material which on the occasion of molding a housing section in a lead frame, is able to prevent generation of an unfilled section and a void in the obtained molded article and suppress generation a burr and has excellent continuous moldability.

Furthermore, the thermosetting material of the present invention can be suitably utilized as a thermosetting material capable of molding a housing section which on the occasion of sealing a light-emitting element section on a lead frame of a sealant of a light-emitting element, prevents spreading of the sealant and leakage of light to the lateral direction, has low reflectivity when non-lighting and a large contrast ratio between lighting and non-lighting, and has excellent heat resistance and light resistance.

The invention claimed is:

1. A thermosetting material, comprising the following components (A) to (C) and at least one component selected from the group consisting of the following components (D) to (F):

(A) a (meth)acrylate compound in which a substituted or unsubstituted hydrocarbon group having at least 6 carbon atoms is ester-bonded, wherein a substituted or unsubstituted alicyclic hydrocarbon group having, at least 6 carbon atoms is at least one selected from the group consisting of a substituted or unsubstituted adamantyl group and a substituted or unsubstituted isobornyl group, wherein the (meth)acrylate compound has a viscosity of from 5 to 300 mPa·s, when measured with a rotational viscometer at a constant shear rate by a method of JIS K7117-2:1999 at 25° C. and a shear rate of from 10 to 100 s$^{-1}$;

(B) spherical silica, (C) a black pigment, (D) (meth)acrylic acid or a monofunctional (meth)acrylate compound having a polar group;

(E) a monofunctional (meth)acrylate compound other than the components (A) and (D); and (F) a polyfunctional (meth)acrylate compound other than the component (A), wherein wherein a content of the component (B) is from 79% to 90% by mass based on 100% by mass of a total of the components (A) to (F), wherein a content of the component (C) is from 0.1% by mass to less than 1% by mass based on 100% by mass of a total of the components (A), (B), and (C), wherein a total of the component (A), (D), (E), and (F) is from 1% to 20% by mass based on 100% by mass of the total of the components (A) to (F), and wherein the thermosetting material has a viscosity of from 5 Pa·s to 200 Pa·s, when measured with a rotational viscometer at a constant shear rate by the method of HS K7117-2:1999 at 25° C. and a shear rate of 10 s$^{-1}$; and a viscosity of from 0.3 Pa·s to 50 Pa·s, when measured with a rotational viscometer at a constant shear rate by the method of HS K7117-2:1999 at 25° C. and a shear rate of 100 s$^{-1}$.

2. The thermosetting material of claim 1, wherein the component (C) comprises at least one selected from the group consisting of the following components:

a metal oxide pigment;

a composite metal oxide pigment;

a carbon pigment comprising activated carbon, carbon black, or a combination thereof;

a mixed organic pigment having been made black upon mixing an organic pigment comprising aniline black; and a titanium-based black pigment represented by $TiO_x$ or $TiO_xN_y$, wherein the metal oxide pigment, the composite metal oxide pigment, or a combination thereof comprises at least one metal selected from the group consisting of chromium (Cr), cobalt (Co), nickel (Ni), iron (Fe), manganese (Mn), and copper (Cu).

3. The thermosetting material of claim 1, wherein a content of the component (A) is from 1% to 15% by mass based on 100% by mass of a total of the components (A) to (F).

4. The thermosetting material of claim 1, wherein the spherical silica is one subjected to a surface treatment with a (meth)acrylsilane.

5. The thermosetting material of claim 1, wherein the spherical silica has an average particle diameter of from 0.1 μm to 100 μm.

6. The thermosetting material of claim 1, further comprising the following component (G):

(G) at least one nano particle selected from the group consisting of silver, gold, silicon, silicon carbide, silica, aluminum oxide, copper oxide, iron oxide, cobalt oxide, titanium oxide, titanium nitride, titanium oxynitride, titanium carbide, zinc oxide, zirconium oxide, cerium oxide, ITO (indium tin oxide), ATO (antimony trioxide), hydroxyapatite, graphene, graphene oxide, single-walled carbon nanotuhe, multi-walled carbon nanotube, fullerene, diamond, and mesoporous carbon.

7. A method for molding a thermosetting material, the method comprising:

supplying the thermosetting material of claim 1 into a plunger;

filling the thermosetting material supplied in the plunger into a cavity within a mold by the plunger;

thermally curing the thermosetting material in the cavity, to obtain a thermally cured thermosetting material; and taking the thermally cured thermosetting material out of the cavity.

8. The method of claim 7, wherein a mold temperature of the cavity is from 100° C. to 180° C.

9. The method of claim 7, wherein in the filling, the thermosetting material is filled in the cavity within the mold through a flow channel being temperature controlled to 50° C. or lower.

10. The method of claim 7, wherein a filling apparatus in the filling is provided with a gate system which shuts off a flow of a curable liquid and delivery and receipt of heat, in a flow channel between the plunger and the cavity.

11. The method of claim 10, wherein in the filling, a gate of the gate system is opened to fill the thermosetting material in the cavity within the mold; and in the curing, after starting the curing, an injection pressure of the thermosetting material is increased to carry out pressure holding before completion of curing, and after completion of the pressure holding, the gate of the gate system is closed to complete the thermal curing.

12. The method of claim 7, wherein the filling and the curing are conducted from 0.2 minutes to 3 minutes.

13. The thermosetting material of claim 1, wherein the content of component (C) is from 0.1% to 1% by mass based on 100% by mass of the total of the components (A) to (F).

14. The thermosetting material of claim 1, wherein the component (F) is present, and a content of the component (F) is from 0.1% to 70% by mass based on 100% by mass of the total of the components (A), (D), (E), and (F).

* * * * *